United States Patent
Lounsberry

(10) Patent No.: US 11,783,062 B2
(45) Date of Patent: Oct. 10, 2023

(54) RISK-BASED ACCESS TO COMPUTING ENVIRONMENT SECRETS

(71) Applicant: Microsoft Technology Licensing, LLC, Redmond, WA (US)

(72) Inventor: Brian Lounsberry, Kenmore, WA (US)

(73) Assignee: Microsoft Technology Licensing, LLC

( * ) Notice: Subject to any disclaimer, the term of this patent is extended or adjusted under 35 U.S.C. 154(b) by 107 days.

(21) Appl. No.: 17/176,945

(22) Filed: Feb. 16, 2021

(65) Prior Publication Data
US 2022/0261487 A1    Aug. 18, 2022

(51) Int. Cl.
*G06F 21/62* (2013.01)

(52) U.S. Cl.
CPC .................... *G06F 21/62* (2013.01)

(58) Field of Classification Search
CPC ................. G06F 21/62–629; H04L 63/10–108
See application file for complete search history.

(56) References Cited

U.S. PATENT DOCUMENTS

| | | | |
|---|---|---|---|
| 9,130,986 B2 * | 9/2015 | Troyansky | G06F 21/6218 |
| 10,885,162 B2 * | 1/2021 | Avital | G06F 21/44 |
| 2003/0163569 A1 | 8/2003 | Panasyuk et al. | |
| 2005/0198380 A1 | 9/2005 | Panasyuk et al. | |
| 2008/0301779 A1 | 12/2008 | Garg et al. | |
| 2010/0266132 A1 | 10/2010 | Bablani et al. | |
| 2011/0113481 A1 | 5/2011 | Panasyuk et al. | |
| 2012/0060204 A1 | 3/2012 | Panasyuk et al. | |
| 2012/0137368 A1 * | 5/2012 | Vanstone | G06F 21/60 726/25 |
| 2014/0007179 A1 * | 1/2014 | Moore | H04L 63/10 726/1 |
| 2014/0196121 A1 | 7/2014 | Alkhatib et al. | |
| 2016/0226914 A1 * | 8/2016 | Doddy | G06F 21/45 |
| 2018/0027006 A1 | 1/2018 | Zimmermann et al. | |

(Continued)

OTHER PUBLICATIONS

Chapin, Peter, Christian Skalka, and X. Sean Wang. "Risk assessment in distributed authorization." Proceedings of the 2005 ACM workshop on Formal methods in security engineering. 2005. (Year: 2005).*

(Continued)

*Primary Examiner* — Madhuri R Herzog
(74) *Attorney, Agent, or Firm* — Ogilvie Law Firm

(57) ABSTRACT

Technology for risk-based access to secrets utilizes risk metadata tailored to secrets. Secrets include passwords, security tokens, digital certificates, and other items used for identity authentication, authorization, signing, validation, and other cybersecurity processes. A secret's risk metadata may indicate which controls protect the secret, the deployment scope of the secret or the asset it secures, known exposures of the secret, whether the secret secures other secrets, the impact if the secret is misused, the secret's strength, characteristics of the asset the secret secures, the secret's risk history, and other characteristics of secrets that set them apart. Unlike secrets, typical user-generated digital assets like web pages, documents, image files, and so on have value on their own. An enhanced system distinguishes between secrets and non-secrets when modulating access, making it possible to automatically provide consistent, efficient, and effective risk-based control over access to secrets.

20 Claims, 5 Drawing Sheets

---

ENHANCED COMPUTING SYSTEM 102, 400

MEMORY 112: SECRETS 304 AUGMENTED BY RISK METADATA 302 SUCH AS RISK SCORES 410, RISK-BASED SECRET ACCESS SOFTWARE 408, SECURED DATA ASSETS 404, 402

PROCESSOR 110 | SECURED ASSETS 402 | INTERFACES 406

(56) References Cited

U.S. PATENT DOCUMENTS

| | | | |
|---|---|---|---|
| 2019/0260777 A1* | 8/2019 | Mehrotra | H04L 63/08 |
| 2019/0286812 A1 | 9/2019 | Lounsberry et al. | |
| 2019/0286813 A1 | 9/2019 | Lounsberry et al. | |
| 2019/0288839 A1 | 9/2019 | Lounsberry et al. | |
| 2019/0288995 A1 | 9/2019 | Bose et al. | |
| 2019/0372758 A1 | 12/2019 | Tevosyan et al. | |
| 2020/0106801 A1 | 4/2020 | Evans | |
| 2020/0143037 A1* | 5/2020 | Sunkavally | H04L 63/20 |
| 2020/0252422 A1 | 8/2020 | Davis et al. | |
| 2020/0267004 A1 | 8/2020 | Lounsberry et al. | |
| 2020/0280449 A1 | 9/2020 | Shankar et al. | |
| 2020/0287888 A1* | 9/2020 | Moore | H04L 63/0227 |

OTHER PUBLICATIONS

"International Search Report and Written Opinion Issued in PCT Application No. PCT/US22/015394", dated May 19, 2022, 10 Pages.
"Audit logs for your Azure Data Box and Azure Data Box Heavy", retrieved from <<https://docs.microsoft.com/en-us/azure/databox/data-box-audit-logs>>, Jul. 10, 2020, 5 pages.
"OWASP Risk Rating Methodology", retrieved from <<https://www.linuxsecrets.com/owasp-wiki/index.php/OWASP_Risk_Rating_Methodology.html», Aug. 7, 2018, 7 Pages.
"Threat Detection", retrieved from <<https://keyvaultdocs.azurewebsites.net/dSMS/ThreatDetection.html>>, retrieved date: Dec. 18, 2020, 3 Pages.
"Whitelisting", retrieved from <<https://keyvaultdocs.azurewebsites.net/dSMS/Onboarding/Whitelisting.html>>, retrieved date: Dec. 18, 2020, 5 Pages.
"Getting started with Kusto", retrieved from <<https://docs.microsoft.com/en-us/azure/data-explorer/kusto/concepts/>>, Feb. 13, 2020, 3 pages.
"Access control", retrieved from <<https://en.wikipedia.org/wiki/Access_control>>, Jan. 5, 2021, 15 pages.
"SolarWinds Access Rights Manager Features", retrieved from <<https://www.solarwinds.com/access-rights-manager/use-cases>>, retrieved Feb. 4, 2021, 13 pages.
"Attribute-based access control", retrieved from <<https://en.wikipedia.org/wiki/Attribute-based_access_control>>, Feb. 3, 2021, 7 pages.
"Cloud Permissions Management Platform", retrieved from <<https://cloudknox.io/products-solutions/>>, retrieved Feb. 4, 2021, 9 pages.
"Computer security", retrieved from <<https://en.wikipedia.org/wiki/Computer_security>>, Jan. 31, 2021, 46 pages.
"Cryptographic key types", retrieved from <<https://en.wikipedia.org/wiki/Cryptographic_key_types>>, Jan. 12, 2021, 4 pages.
"Digital rights management", retrieved from <<https://en.wikipedia.org/wiki/Digital_rights_management>>, Jan. 17, 2021, 31 pages.
"Government Security Classifications Policy", retrieved from <<https://en.wikipedia.org/wiki/Government_Security_Classifications_Policy>>, Jan. 3, 2021, 6 pages.
"Hardware security module", retrieved from <<https://en.wikipedia.org/wiki/Hardware_security_module>>, Jan. 29, 2021, 5 pages.
"HashiCorp", retrieved from <<https://en.wikipedia.org/wiki/HashiCorp>>, Jan. 15, 2021, 3 pages.
"Machine learning", retrieved from <<https://en.wikipedia.org/wiki/Machine_learning>>, Jan. 31, 2021, 25 pages.
"Certificates overview for Azure Cloud Services (classic)", retrieved from <<https://docs.microsoft.com/en-us/azure/cloud-services/cloud-services-certs-create>>, Oct. 14, 2020, 5 pages.
"Frequently asked questions", retrieved from <<https://docs.microsoft.com/en-us/azure/security/develop/security-code-analysis-faq>>, Jul. 31, 2019, 9 pages.
"Role-based access control (RBAC) vs. Claims-based access control (CBAC) in asp.net MVC", retrieved from <<https://stackoverflow.com/questions/22814023/role-based-access-control-rbac-vs-claims-based-access-control-cbac-in-asp-n>>, Apr. 14, 2014, 13 pages.
"Secrecy", retrieved from <<https://en.wikipedia.org/wiki/Secrecy>>, Dec. 1, 2020, 7 pages.
"Shared secret", retrieved from <<https://en.wikipedia.org/wiki/Shared_secret>>, Jan. 24, 2021, 1 page.
"Toward a Taxonomy of Secrets", retrieved from <<https://cryptome.org/0003/secrets-taxonomy.htm>>, Nov. 26, 2010, 6 pages.
Meagan Longoria, "Parameterizing a REST API Linked Service in Data Factory", retrieved from <<https://datasavvy.me/2020/01/30/parameterizing-a-rest-api-linked-service-in-data-factory/>>, Jan. 30, 2020, 5 pages.
VC Sreedhar, "The 7 Habits of Highly Effective Management of Secrets", retrieved from <<https://vc-sree.medium.com/the-7-habits-of-highly-effective-management-of-secrets-fb5bf86eb3c7>>, Nov. 2, 2020, 4 pages.
"Monitoring Azure resources with Azure Monitor", retrieved from <<https://docs.microsoft.com/en-us/azure/azure-monitor/insights/monitor-azure-resource>>, Oct. 8, 2019, 11 pages.
"Secure your management ports with just-in-time access", retrieved from <<https://docs.microsoft.com/en-us/azure/security-center/security-center-just-in-time?tabs=jit-config-asc%2Cjit-request-asc>>, Jul. 12, 2020, 8 pages.
"Amazon GuardDuty", retrieved from <<https://aws.amazon.com/guardduty/>>, retrieved Feb. 13, 2021, 14 pages.
"Certificate Transparency", retrieved from <<https://certificate.transparency.dev/>>, retrieved Feb. 13, 2021, 7 pages.
"About keys", retrieved from <<https://docs.microsoft.com/en-us/azure/key-vault/keys/about-keys>>, Sep. 15, 2020, 3 pages.
"About Azure Key Vault secrets", retrieved from <<https://docs.microsoft.com/en-us/azure/key-vault/secrets/about-secrets>>, Sep. 4, 2019, 5 pages.
"About Azure Key Vault certificates", retrieved from <<https://docs.microsoft.com/en-us/azure/key-vault/certificates/about-certificates>>, Sep. 4, 2019, 7 pages.

\* cited by examiner

| SOME ITEMS THAT MAY SERVE AS SECRETS 204 |||
|---|---|---|
| DIGITAL CERTIFICATE 504 | PRIVATE KEY 506 | AUTHENTICATION KEY 522 |
| ENCRYPTION KEY 518 | DECRYPTION KEY 520 | SIGNATURE KEY 516 |
| LOGIN CREDENTIAL 536 | PASSWORD OR PASS PHRASE 502 ||
| DIGITAL REPRESENTATION 524 OF BIOMETRIC DATA 526 |||
| APPLICATION PROGRAM 124 KEY 528 || BEARER TOKEN 532 |
| SHARED ACCESS SIGNATURE 530 || CONNECTION STRING 534 |
| SYMMETRIC / ASYMMETRIC ENCRYPTION ALGORITHM 508 / 510 KEY 512 / 514 |||

Fig. 5

| SOME MODULATIONS 600 THAT MAY USE AN AUGMENTED SECRET 304 ||
|---|---|
| ACCESS 608 AUTHENTICATION 606, AUTHORIZATION 604, VALIDATION 614 ||
| DECRYPTION / ENCRYPTION 610 / 612 | DIGITAL SIGNING 602 |

Fig. 6

| SOME EXAMPLES OF SECRETS RISK METADATA 302 ||
|---|---|
| PROTECTION METADATA 718 | ROTATION METADATA 720 |
| RISK HISTORY METADATA 732 PER TREND 734 OR PROJECTION 736 ||
| TRANSITIVITY METADATA 702 PER SECRETS DEPENDENCE 704 ||
| RISK SCORE 410 | SCOPE METADATA 706 PER DEPLOYMENT SCOPE 708 |
| STRENGTH METADATA 730 | IMPACT METADATA 710 PER IMPACT 712 |
| AUDIT METADATA 722 | OWNER 728 CLASSIFICATION 726 METADATA 724 |
| EXPOSURE METADATA 714 PER KNOWN EXPOSURE 716 | ID METADATA 738 |

Fig. 7

| SOME SCOPE METADATA 706 ITEMS |||
|---|---|---|
| 838: SHARING EXTENT 840 | 802: VIRTUAL MACHINES 804 SCOPE 806 ||
| 808: CLOUD 812 REGIONS 810 SCOPE 814 (MAY BE ALL 816) |||
| 818: HOSTS 820 SCOPE 822 | 824: REPLICATED SERVICE(S) 828 SCOPE 826 ||
| 830: ASSET 402 CHARACTERISTIC 832 | 834: ASSET 402 SCOPE 836 ||

Fig. 8

| SOME EXPOSURE METADATA 714 ITEMS ||
|---|---|
| 904: TRANSMITTED IN CLEAR | 908: STORED IN CLEAR IN VOLATILE MEMORY |
| 916: SOURCE CODE USE OR INVOCATION | 918: IN HONEYPOT 920 |
| 902: TO HUMAN IN CLEAR | 906: STORED IN CLEAR IN NONVOLATILE MEMORY |
| 910: COPIED TO OUTSIDE SCOPE | 912: COPIED TO REMOVABLE DEVICE 914 |

Fig. 9

| SOME PROTECTION METADATA 718 ITEMS |||
|---|---|---|
| 1002: ACCESS CONTROL LIST 1004 | 1010: HARDWARE-BACKED KEY 1012 ||
| 1006: SECRETS MANAGER SERVICE 1008 | 1014: CODE REVIEW 1016 ||
| 1018: HARDWARE SECURITY MODULE 1020 | 1026: ATTESTATION 1028 ||
| 1022: AIR-GAPPED 1024 | 1044: DEVICE / FACILITY 102 / 1046 CHARACTERISTIC 1032 ||
| | 1030: AFFIRMING ENTITY 1034 CHARACTERISTIC 1032 ||
| 1036: ORIGINATING ENTITY 1038 CHARACTERISTIC 1032 |||
| 1040: POSSESSING ENTITY 1042 CHARACTERISTIC 1032 |||

Fig. 10

RISK-BASED ACCESS TO COMPUTING ENVIRONMENT SECRETS

BACKGROUND

Attacks on computing systems take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within a computing system. No single security mechanism is able to detect every kind of cyberattack, or able to end every detected cyberattack. But sometimes combining and layering a sufficient number and variety of defenses will deter an attacker, or at least limit the scope of harm from an attack.

To implement defense in depth, cybersecurity professionals consider the different kinds of attacks that could be made. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place.

In particular, installing tools and techniques that utilize various secrets is often part of implementing defense in depth. Some examples of secrets include passwords, encryption keys, decryption keys, and digital certificates, and tokens, which are used for identity authentication or as a proof of authorization.

Many cyberattacks involve some form of secret. For example, in password spray attacks an attacker tests a possible password against multiple accounts. In some social engineering attacks, an attacker mimics a legitimate website or pretends to be an authorized user in an attempt to obtain passwords and other login credentials from people who are actually authorized users. In a brute force attack on an encrypted document, an attacker tries out many different possible decryption keys.

In general, account users are encouraged to choose passwords and keys that are difficult to guess, and to keep them confidential. Multifactor authentication may also be used. However, improvements are still possible in the field of cybersecurity.

SUMMARY

Secrets are often used to secure data, hardware, software, bandwidth, and other assets in a computing environment. Some embodiments described in this document provide improved technology for securing secrets themselves. In particular, some embodiments augment secrets with risk metadata. The risk metadata supports embodiments that include innovative control procedures and mechanisms for risk-based access to secrets, to improve or replace ad hoc, inconsistent, gap-filled, or otherwise inadequate approaches to the security of secrets.

Some embodiments use or provide a hardware and software combination which is configured for risk-based secret access management. The combination includes a digital memory configured by a particular secret residing in the digital memory, and a processor which is in operable communication with the memory. The processor is configured, e.g., by tailored software, to perform risk-based secret access management steps, which include (a) distinguishing functionally between access to computing system assets which are secrets and access to computing system assets which are not secrets, and (b) computationally modulating access to the particular secret or to an asset secured using the particular secret, or both, based on at least a risk score which is associated with the particular secret.

Some embodiments provide or use a method for risk-based access to a secret which is stored as digital data in a computing environment, including: augmenting the secret with risk metadata which is also stored as digital data in the computing environment, automatically calculating a risk score for the secret, the calculated risk score based at least on at least a portion of the risk metadata, and computationally modulating access to the secret based on at least the risk score.

Some embodiments provide or use a computer-readable storage medium configured with data and instructions which upon execution by a processor cause a computing system to perform a method for risk-based access to secrets which are stored as digital data in a computing environment. The method includes: automatically noting a request to access an augmented secret or an asset secured using the augmented secret, or both, wherein the augmented secret includes a secret which is augmented with risk metadata; and computationally modulating access to the augmented secret or to an asset secured using the augmented secret, or both, based on at least a portion of the risk metadata.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 5 is a block diagram illustrating some examples of items that may serve as secrets;

FIG. 6 is a block diagram illustrating some examples of modulations that may use a secret;

FIG. 7 is a block diagram illustrating some examples of different kinds of secrets risk metadata;

FIG. 8 is a block diagram illustrating some examples of scope metadata, which is a kind of secrets risk metadata;

FIG. 9 is a block diagram illustrating some examples of exposure metadata, which is a kind of secrets risk metadata;

FIG. 10 is a block diagram illustrating some examples of protection metadata, which is a kind of secrets risk metadata;

DETAILED DESCRIPTION

Overview

Figure 1:
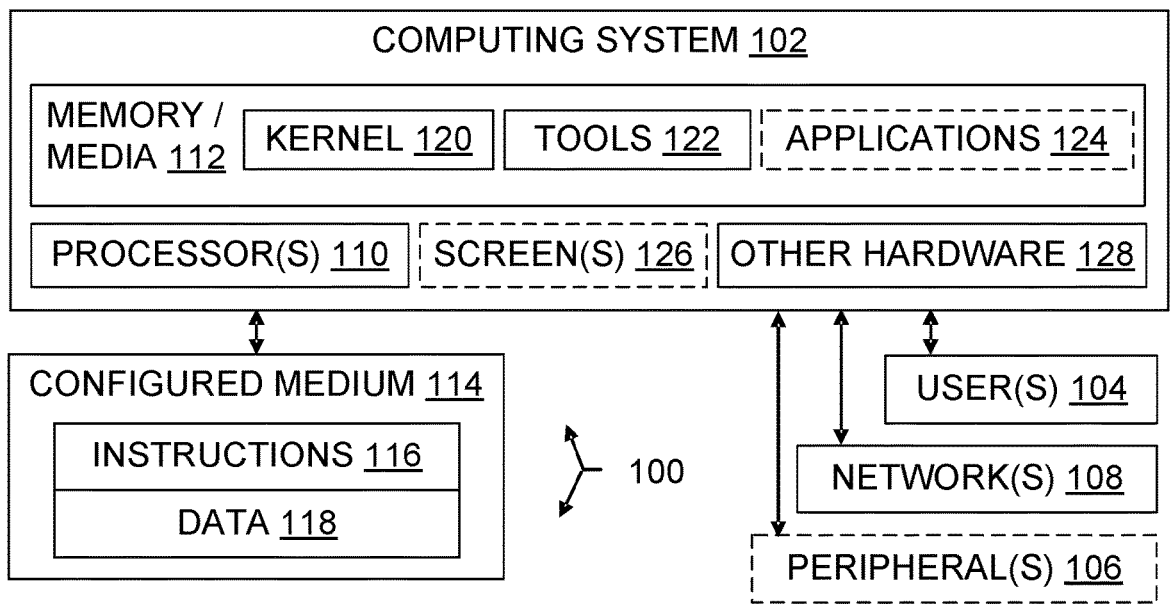
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by a perspective change that highlighted technical challenges facing people who are working to improve the usability of cybersecurity offerings.

In a typical cybersecurity perspective, data is the main asset to protect. The data deemed most valuable often includes user-generated data 202 such as financial documents, email, network transmissions, databases, product plans and specifications, customer lists, patent applications, and so on. Data 202 is protected, e.g., against exfiltration by scanning outgoing transmissions, against errors by using checksums, against loss by using backups, against tampering by using access controls and signatures, against unwanted disclosure by using intrusion prevention systems, and against unwanted access generally. By contrast, secrets 204 such as passwords and cryptologic keys often received attention only to the extent that they were seen as part of, or related to, the cybersecurity controls 206 put in place to protect the data.

A different perspective sheds light on some of the teachings presented herein. Instead of viewing passwords and cryptologic keys and other secrets 204 through the lens of the data 202 they help protect, one may treat secrets 204 as an important and distinctive kind of data 118 in their own right. In particular, one may augment secrets 204 with risk metadata 302, thereby producing augmented secrets 304 that support different security controls 306.

Many scenarios and other examples are provided herein. Two introductory examples are provided below to help illustrate the technical challenges and functional benefits of risk metadata 302 that is specific to secrets 204 as opposed to risk data that relates only to non-secrets data 202. The first example highlights a functional relationship between a secret and an asset the secret secures. The secured asset may be data, code, hardware, bandwidth, reputation, or any other manufactured or measurable item. The second example highlights a functional relationship in which one secret secures another secret.

Secured asset characteristics. Secrets 204 generally have no value in and of themselves; a secret's value depends on the value of the data 404, hardware 102, 106, 128, network 108 bandwidth, reputation, or other asset 402 the secret helps to secure.

In particular, the value of a secret may vary as the deployment scope of data or code secured by the secret varies. For instance, consider scenarios in which digital signatures 602 are used to authenticate software as coming from a trusted source and being free of tampering. A hypothetical digital signature X that authenticates an application prototype 124 that is running only in a development environment, for instance, secures an asset of much smaller scope than a digital signature Y that authenticates part of a kernel 120 that is installed on millions of computers. The value of digital signature X can be reasonably viewed as much lower than the value of digital signature Y, because the risk posed by misuse of X is much smaller than the risk posed by misuse of Y.

To permit effective and efficient risk-based management of access to digital signatures and other secrets, some embodiments include secrets risk metadata 302 that captures aspects of risk differences that arise from differences in the deployment scope or in other characteristics of assets that are secured 1444 by secrets, or differences in the deployment scope or other characteristics of instances of the secrets themselves.

For example, some embodiments utilize scope metadata 706, 302 representing the deployment scope 708 of a respective augmented secret 304 or its secured asset 402. In the scenarios above, the deployment scope of digital signature X could be represented as "less than ten machines" or as "development phase", for instance, while the deployment scope of digital signature Y could be represented as "at least one hundred thousand machines" or as "released and supported". Other deployment scope 708 values may also be used in various embodiments. Also, terminology other than "deployment scope" may be used in some implementations, e.g., "distribution" or "distribution scope" or "blast radius" or "spread".

Some embodiments additionally or instead utilize impact metadata 710 representing an impact 712 of misuse of the secured data 404 or other secured asset 402. In the scenarios above, the impact of digital signature X could be represented as "DevOp schedule" or as "internal", for instance, while the impact of digital signature Y could be represented as "reputational" or as "CFO alert". Other impact 712 values may also be used in various embodiments. Also, terminology other than "impact" may be used in some implementations, e.g., "damage" or "scope".

Risk transitive secrets. To the extent passwords 502, 204 are protected, that protection is typically a one-size-fits-all approach that does not distinguish between different kinds of passwords. Cybersecurity practices encourage making all passwords difficult to guess or determine through brute-force computation, keeping all passwords confidential so that they are known only to authorized users, and allowing all passwords only limited usable lives.

But these very general password protection practices fail to recognize that some passwords secure other passwords, which makes some passwords qualitatively different than other passwords. In other words, risk may be transitive for some passwords. For instance, a password M to a password manager that secures both a video streaming service account password S and other passwords Zn is different than the video streaming service account password S (assuming a breach of password S would not increase the risk to any other password). Likewise, a password E to an email account that is part of a password reset workflow for multiple other accounts is different than the passwords Zn for those other accounts when none of those passwords Zn transfer a risk increase to any other passwords. Other examples of transitive risk secrets include a key encrypting key, and a key transport key.

Security is enhanced in some embodiments, both as to efficiency and efficacy, by augmenting passwords 502, 304 with transitivity risk metadata 702, 302 that indicates whether other passwords 502 are dependent 704 on the augmented password. In some embodiments operating under the scenarios above, risk metadata 702 indicates that the password manager password M and the email account password E each have dependent passwords. That is, risk metadata 702 indicates that risk is transitive through the password manager M password and the email account password E to one or more other passwords. Similarly, risk metadata 702 would indicate that the video streaming service account password S is not risk transitive.

These and other embodiments reflect several technical challenges. One technical challenge is determining which kinds of risk metadata to use. This is met initially by identifying different kinds of metadata 302 that are useful from a cybersecurity perspective for risk-based secrets management. Scenarios above involve transitivity metadata 702, scope metadata 706, or impact metadata 710, but many other examples of secrets risk metadata 302 are also taught herein.

Another technical challenge is how to automatically generate the secrets risk metadata 302. To create or update transitivity risk metadata 702, an embodiment may distinguish between services that use transitive risk passwords and those that do not, e.g., based on a list of service IDs. To create or update scope metadata 706 or impact metadata 710, build tools, deployment tools, health monitoring tools, and other dev or admin tools 122 may be enhanced to also track secrets, where traditionally they track only code or data that may or may not be secured by secrets.

Yet another challenge is how to use the risk metadata to efficiently enhance security. An embodiment may require additional authentication for access to (or use of) passwords that pose a transitivity risk or have a wide scope or a large potential impact if misused, without imposing those corresponding costs on non-transitivity passwords. What qualifies as a "wide" scope or a "large" impact may vary between embodiments and implementations, and may be specified relatively as a percent or ratio, or be specified in absolute terms. For example, a wide scope may be set as more than ten virtual machines in one implementation, as more than one cloud region in another implementation, and as more than twenty percent of a given subscriber's storage containers in yet another implementation. Similarly, a large impact may be set as more than two cloud tenants, or as more than US $10000, or as more than one geo-replica of a surface.

The foregoing examples and scenarios are not comprehensive. As will be readily apparent, e.g., by considering FIGS. 6-14 and other discussions herein, the teachings herein include a variety of secrets risk metadata and many other cybersecurity uses ("modulations") of secrets risk metadata in risk-based access to secrets embodiments.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, risk-based secrets access functionality could be installed on an air gapped network and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems

Figure 2:
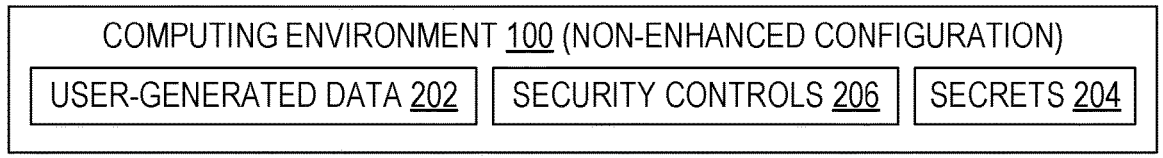
FIG. 2 is a block diagram illustrating aspects of a computing environment which has a configuration that lacks the enhancements taught herein.

FIG. 2 illustrates a computing environment in a configuration which lacks the risk-based secrets access enhancements taught herein. The computing environment may be a single machine, a local network of machines, a particular building, a particular entity, a datacenter, a cloud, or another computing environment 100. User-generated data 202 resides in the computing environment. At least some of the user-generated data 202 is secured by security controls 206 that utilize one or more passwords or other secrets 204 but do not utilize metadata specific to secrets as taught herein.

Figure 3:
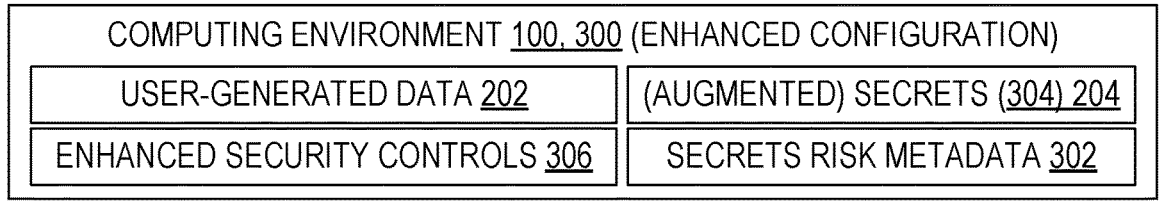
FIG. 3 is a block diagram illustrating aspects of a computing environment which has a configuration enhanced according to one or more approaches taught herein, such as augmenting secrets with risk metadata and tailoring security controls to utilize such secret risk metadata.

By contrast, FIG. 3 illustrates a computing environment configured by one or more of the risk-based secrets access enhancements taught herein. This enhanced computing environment 100 may be a single machine, a local network of machines, a particular building, a particular entity, a datacenter, a cloud, or another computing environment 100 that is suitably enhanced. In this example, the security enhancements include secrets risk metadata 302 which is associated with respective secrets 204 to thereby form augmented secrets 304, and also include one or more security controls 306 which utilize the secrets risk metadata 302. In this example, controls 206 that do not rely on the secrets risk metadata 302 are also present. By way of at least one difference in operation between the non-enhanced controls 206 and the enhanced controls 306, this example distinguishes functionally between access to computing assets (e.g., data 202) which are not secrets 204 and computing assets (e.g., augmented secrets 304) which are secrets.

More generally, in some embodiments the extent of the computing environment 100 is defined as the smallest connected (in the network accessibility sense) set of one or more computing systems 102 which each hold an augmented secret 304 involved in an access request or an asset 402 secured 1444 using the augmented secret, or both. For example, suppose a system A and a system B each hold augmented secrets, but A is air-gapped; then A and B are in different computing environments. As another example, suppose systems A, B, and C are all in the same LAN, but only A and B hold an augmented secret or an asset secured using the augmented secret, or both; then A and B are in one computing environment and C is in a different computing environment. As a third example, suppose system A is in one cloud region and system B is in another cloud region, but A and B can communicate over the internet and they each hold an augmented secret or an asset secured using the augmented secret, or both; then A and B are in the same computing environment as each other.

FIGS. 2 and 3 are merely examples. A given computing environment may also include other items not expressly shown in these Figures, e.g., cloud regions, certificate authorities, repositories, kernels, buildings, and so on.

Figure 4:
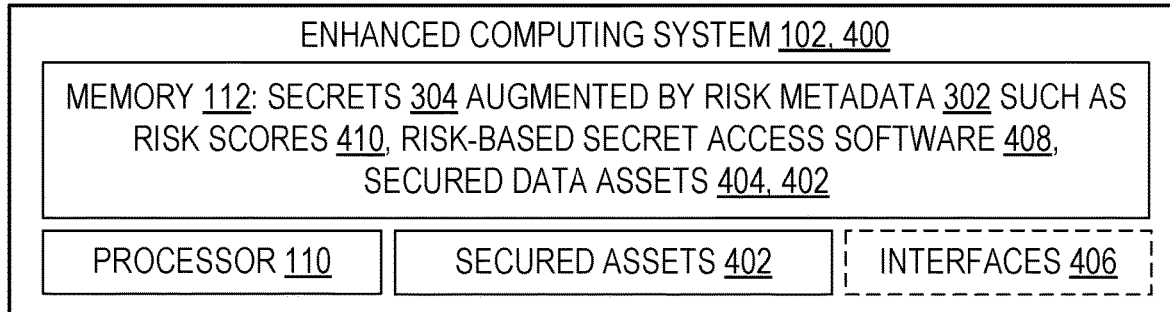
FIG. 4 is a block diagram illustrating an enhanced system configured with functionality for risk-based access to secrets.

FIG. 4 illustrates an enhanced system 400 which is configured to perform risk-based secrets access. The enhanced system 400 may be networked through an interface 406. An interface 406 may include hardware such as network interface cards, software such as network stacks, APIs, or sockets, combination items such as network connections, or a combination thereof.

The enhanced system 400 includes assets 402 secured by augmented secrets 304; system 400 may also include assets 402 secured by secrets 204 that have not been augmented with risk metadata 302. The enhanced system 400 also includes software 408 tailored to perform risk-based management of access to secrets 204, 304. For example, software 408 may perform a method illustrated in FIG. 13 or FIG. 14. In particular, software 408 may modulate access based on a risk score 410 that is associated with a particular augmented secret 304 or a set of secrets 304, 204.

Although a secret 204 is an example of an asset, and may well be a secured asset 402, secrets are a special kind of asset, due to the sensitivity and unique characteristics of secrets. It is substantially harder to properly manage and secure secrets than to manage and secure a non-secret asset such as a published web page. However, in view of the teachings herein one of skill will acknowledge that benefits such as more effective and efficient cybersecurity follow from improved management of access to secrets.

FIG. 5 shows some examples of items that may serve as secrets 204, and which may be augmented with metadata 302 to become augmented secrets 304. This is a set of examples only, not a comprehensive list. These items and other secrets are discussed at various points herein, and additional details regarding them are provided in the discussion of a List of Reference Numerals later in this disclosure document.

FIG. 6 shows some examples of access modulations 600 that may use one or more augmented secrets 304. This is a set of examples only, not a comprehensive list. These items and other modulations 600 are discussed at various points herein, and additional details regarding them are provided in the discussion of a List of Reference Numerals later in this disclosure document.

FIG. 7 shows some examples of secrets risk metadata 302. This is a set of examples only, not a comprehensive list. These items and other metadata 302 are discussed at various points herein, and additional details regarding them are provided in the discussion of a List of Reference Numerals later in this disclosure document.

FIG. 8 shows some examples of scope metadata 706 items; scope metadata is a kind of secrets risk metadata 302. This is a set of examples only, not a comprehensive list. These items and other metadata 302 are discussed at various points herein, and additional details regarding them are provided in the discussion of a List of Reference Numerals later in this disclosure document.

FIG. 9 shows some examples of exposure metadata 714 items; exposure metadata is a kind of secrets risk metadata 302. This is a set of examples only, not a comprehensive list. These items and other metadata 302 are discussed at various points herein, and additional details regarding them are provided in the discussion of a List of Reference Numerals later in this disclosure document.

FIG. 10 shows some examples of protection metadata 718 items; protection metadata is a kind of secrets risk metadata 302. This is a set of examples only, not a comprehensive list. These items and other metadata 302 are discussed at various points herein, and additional details regarding them are provided in the discussion of a List of Reference Numerals later in this disclosure document.

Figure 11:
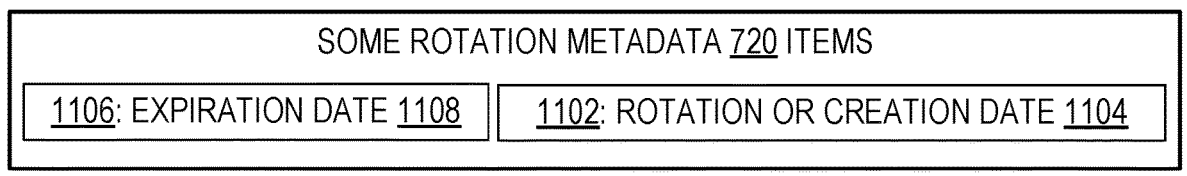
FIG. 11 is a block diagram illustrating some examples of rotation metadata, which is a kind of secrets risk metadata.

FIG. 11 shows some examples of rotation metadata 720 items; rotation metadata is a kind of secrets risk metadata 302. This is a set of examples only, not a comprehensive list. These items and other metadata 302 are discussed at various points herein, and additional details regarding them are provided in the discussion of a List of Reference Numerals later in this disclosure document.

Figure 12:
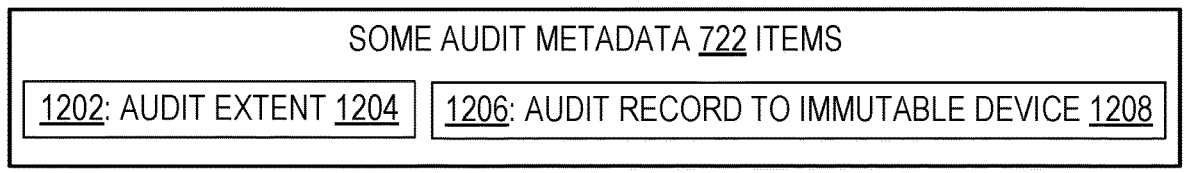
FIG. 12 is a block diagram illustrating some examples of audit metadata, which is a kind of secrets risk metadata.

FIG. 12 shows some examples of audit metadata 722 items; audit metadata is a kind of secrets risk metadata 302. This is a set of examples only, not a comprehensive list. These items and other metadata 302 are discussed at various points herein, and additional details regarding them are provided in the discussion of a List of Reference Numerals later in this disclosure document.

Some embodiments use or provide a functionality-enhanced system, such as system 400 or another system 102 that is enhanced as taught herein. In some embodiments, an enhanced system which is configured for risk-based secret access management includes a digital memory 112, and a processor 110 in operable communication with the memory. The digital memory 112 is configured by a particular secret 304 residing in the digital memory. The processor 110 is configured to perform steps for risk-based secret access management. As noted elsewhere herein, digital memory 112 may be volatile or nonvolatile or a mix. The steps include (a) distinguishing 1302 functionally between access to computing system assets 402 which are secrets 204 and access to computing system assets 402 which are not secrets 204, and (b) computationally modulating 1308 access to the particular secret or to an asset secured using the particular secret, or both, based on at least a risk score 410 which is associated with the particular secret 304.

A catalog or taxonomy of secrets 204 may simply list examples such as keys, certificates, tokens, and so on. In some embodiments, the particular secret 304 residing in the digital memory includes at least one of the following digital items: a digital certificate 504 containing a private key 506 of a key pair (e.g., an X509 certificate), a signed digital certificate 504 containing an identity assertion (e.g., a TLS or SSL identity certificate), a key 514 of an asymmetric encryption algorithm 510 (e.g., a private key or a public key; confidentiality is not a risk for public keys but integrity is), a key 512 of a symmetric encryption algorithm 508 (e.g., an AES key), a signature key 516 (e.g., for signing code or documents), an encryption key 518 (symmetric or asymmetric), a decryption key 520, an authentication key 522, a login credential 536, a password or passphrase 502, a digital representation 524 of biometric data 526, an application program key 528 (e.g., a storage account key), a shared access signature 530 (e.g., for shared access to storage), a bearer token 532 (e.g., an STS token), or a connection string 534 (e.g., in SQL).

Except in rare circumstances, e.g., an encryption password which has never been used to encrypt anything and will not be used for encryption, secrets relate to other data; secrets don't stand on their own. Accordingly, instead of listing example secrets such as keys, certificates, and the like, or in addition to such a listing, a catalog or taxonomy of secrets 204 may list ways in which secrets are used. From a functionality perspective, secrets are data that authenticates, decrypts, etc. In some embodiments, the particular secret 304 residing in the digital memory 112 is a computing system asset 402 and includes at least one of the following: digital data 204 which is operable as authorization 604 for an attempt to access 608 another computing system asset, digital data 204 which is operable as authentication 606 for an attempt to access 608 another computing system asset, digital data 204 which is operable as a decryption key 520 for decrypting 610 another computing system asset, digital data 204 which is operable as an encryption key 518 for encrypting 612 another computing system asset, digital data 204 which is operable as a digital signature 602 of another computing system asset, digital data 204 which is operable as a validation 614 of another computing system asset, or digital data 204 which is operable for modulation 600 of an attempt to access another computing system asset.

Some embodiments include a plurality of augmented secrets 304. Each of these augmented secrets has respective risk metadata 302 stored in the digital memory 112. Eleven categories of risk metadata 302 items are listed below as examples. A given embodiment may have one, two, three, four, five, six, seven, eight, nine, ten, or all eleven of these kinds of risk metadata 302.

A risk score 410 is based on secrets metadata 302 but is also itself a kind of secrets metadata 302. The risk score 410 represents risk associated with loss or misuse of the respective augmented secret.

A scope metadata 706 item represents a deployment scope of a respective augmented secret or the asset secured by the secret. A distinction may be made between deployment and distribution elsewhere, with deployment implicating steps such as installing or configuring while distribution involves little if anything besides making a copy available for access (e.g., as a preauthorized cloud file or folder sharing link so that anyone who receives the link can read or edit the shared document. However, "deployment" herein covers both meanings.

An impact metadata 710 item represents an impact 712 of misuse of an asset 402 that is subject to protection using a respective augmented secret 304. The impact may be physical, or precisely measurable in units such as virtual machines or storage containers or cloud regions. However, impact may also be qualitatively assessed even when a precise quantitative measure is not available, e.g., an impact in terms of business, reputation, national security, politics, etc. may be deemed low, medium, or high.

As an example involving reputation risk, assume that a Certificate Authority (CA) issues certificates to customers. Then a third-party CA authority (e.g., a governing board or a key industry actor) issues a statement of distrust in business practices or processes, or based on a conflict of interest, such as a CA buying another CA or a sovereign relationship. This statement of distrust may increase the risk of using a certificate from this authority, and the metadata 302 could be updated 1438 accordingly.

In some embodiments, a high-impact scenario is one that is difficult to remediate or recover, e.g., impact metadata 710 may indicate the multi-service use of a secret, or represent the impact of a revocation of a widely-used certificate such as the Microsoft Root Code Signing Certificate or root PKI certification authority certificate.

An exposure metadata 714 item represents at least one known exposure 716 of a respective augmented secret 304. The exposure may have been complete in the sense that both the underlying secret 204 and its metadata 302 were exposed, or the exposure may have been partial, as when only the underlying secret 204 was exposed. "Exposure" refers to an increased risk of misuse, and "known" refers to facts that establish to a reasonable certainty (more likely than not, for example, although an embodiment may use a higher standard) that the risk increase occurred. Exposure allows, but does not require, actual misuse.

A classification metadata 724 item represents a risk classification 726 of a respective augmented secret 304 obtained from an owner 728 of a service or an asset within the deployment scope of the respective augmented secret. For instance, an owner may assign a risk classification 726 in response to wars, political developments, or similar events whose effect on security is apparent to humans but is not easily determined solely by a computing system.

A protection metadata 718 item represents one or more mechanisms or procedures aimed at preventing unauthorized use of a respective augmented secret 304. Such metadata 718 may also be referred to as "credential security" metadata 718. Any familiar or future developed security control may serve as a mechanism or procedure represented by protection metadata 718.

A strength metadata 730 item represents a likelihood of guessing or brute-forcing a respective augmented secret. Such metadata 730 may also be referred to as "credential strength" metadata 730. For example, key 518 length, encryption algorithm 508 or 510 used, or password 502 complexity may be represented using strength metadata 730.

An audit metadata 722 item represents auditing of access to a respective augmented secret. For example, audit metadata 722 may indicate an auditing status (e.g., underway, or audit last reported 48 hours ago), an auditing capability (e.g., auditing available with contemporaneous streaming of audit results to admin vaults in two regions), or an audit result (e.g., no access attempt during past six hours).

A risk history metadata 732 item represents a trend 734 or a projection 736 of risk to an asset secured by a respective augmented secret. Such metadata 732 may indicate, e.g., that a risk level spiked X times in the last Y months. Risk history metadata 732 can be used to provide some risk score 410 stability e.g., in the situation of a bank account balance 202, 402 that vacillates over and under a risk threshold.

Risk history metadata 732 may include, e.g., data 118 based on or used for making risk predictions or for performing a regression-based risk assessment. Risk history metadata 732 may indicate or be based on external factors such as the number of times similar secrets have been compromised in the last N months, or a projected growth of scope of distribution or exposure or projected appreciation or depreciation of a secured asset (the value of protected material may go up or down based on some domain-specific factors).

A transitivity metadata 702 represents a dependence 704 between a respective augmented secret 304 and another secret. Example scenarios involving a password manager password 304 and an email account password 304 are discussed above.

An identifier metadata 738 item identifies a respective augmented secret 304 without revealing the respective augmented secret. For instance, password hashes may be used to identify passwords without revealing the actual content of the passwords. Among other things, identifier metadata 738 may be used to determine whether rotation 1420 occurred.

Embodiments which include a plurality of augmented secrets 304 may also be characterized in other ways, e.g., by the utilization of N of the particular metadata items illustrated in FIGS. 8 through 12 or taught elsewhere herein. N is any value in the range from one to the total number of metadata items that are shown in any Figure of the present disclosure or described anywhere in the text of the present disclosure.

A scope metadata item 802 indicates virtual machine scope 806, e.g., how many virtual machines 804 a respective augmented secret 304 has been deployed on. The scope may also be referred to as "surface area".

A scope metadata item 808 indicates how many regions 810 of a cloud 812 a respective augmented secret 304 has been deployed in. Such a cloud region deployment scope 814 metadata may (a) list cloud region identifiers that are included, or ones that are excluded, from the deployment, (b) state the number of regions included (or excluded), (c) use a special value 816 to indicate whether all regions of the cloud are in (or not in) the deployment scope, or (d) be a combination of the foregoing, for example.

A scope metadata item 818 indicates a hosts scope 822, e.g., how many hosts 820 a respective augmented secret has been deployed in.

A scope metadata item 824 indicates a replicated services scope 826, e.g., whether any replicated service 828 utilizes a respective augmented secret 304. Particular replicated service(s) 828 may be listed in the metadata as such an indication, or a count of replicated service(s) 828 may be provided, or both.

A scope metadata item 830 indicates a characteristic 832 of an asset 402 that is secured by a respective augmented secret 304. For example, an item 830 may indicate that the secret secures access to multiple cloud services, or secures access to assets used by multiple cloud tenants or multiple cloud service subscribers. One example of a "highly powerful" characteristic secret is a digital certificate 504 that functions as a root certificate, management certificate, so-called "god certificate", or so-called "master certificate", e.g., for access to storage assets.

This item 830 also illustrates a larger point, namely, the metadata kinds and metadata items described herein are not necessarily exclusive. For instance, the fact that a secret 304 secures access to a region-wide virtual machine deployment infrastructure service could be represented using a region-wide characteristic 832 setting in a scope metadata item 830, or using a region-wide scope 814 setting in a scope metadata item 802, or both.

A scope metadata item 834 indicates a deployment scope 836 of an asset secured by a respective augmented secret 304. For example, an item 834 may have a scope 836 setting that represents all storage containers of a cloud, in the case of a secret 304 that secures a storage container management certificate.

A scope metadata item 838 indicates a sharing extent 840 of a respective augmented secret 304. For example, an item 838 may have an extent 840 setting that represents all application program tasks spawned by a specified root task, and indicate that they share an encryption key for encrypting certain data they produce.

More generally, sharing secrets may implicate confidentiality, or availability, or both. Assets 402 that are secured by the same shared secret are all at risk of losing confidentiality if that secret is compromised. As to availability, sharing secrets may add a recovery risk. Assume a secret 204 is shared among some services, so that more than one service uses the same secret. This sharing increases the risk of recovery during a breach. For example, a single service using a single Storage Key 204 can rotate this key safely in isolation. However, three services that share the same Storage Key must engage in careful secret rotation orchestration, which increases the time and complexity of a key rotation or a post-breach recovery operation.

An exposure metadata item 902 indicates whether a respective augmented secret 304 has been exposed in the clear to a human, e.g., accessed by a human, or displayed on screen. Human exposure of a secret 304 differs from, e.g., the secret only being transmitted to an instance of a task on a virtual machine that has no direct access to human-visible I/O devices 106 such as display screens 126 or printers.

An exposure metadata item 904 indicates whether a respective augmented secret 304 has been transmitted in the clear on a network, as opposed to being transmitted only in encrypted form, or not being transmitted at all over any network.

An exposure metadata item 906 indicates whether a respective augmented secret 304 has been stored in the clear on nonvolatile storage, e.g., on a hard drive or a flash drive.

An exposure metadata item 908 indicates whether a respective augmented secret 304 has been stored in the clear on volatile storage, e.g., in RAM. An item 908 may be used by software 408 to distinguish between use in the clear in memory, on the one hand, and use via a Data Protection Application Programming Interface (DPAPI) or other protected memory.

It may be asserted that every secret is stored in the clear in RAM when it is created, or when it is used to gain access to an asset. However, an exposure metadata item 908, like other metadata 302, may have an implied or expressly stated scope. Thus, an encrypted key, for example, or another encrypted secret, which has been received within the scope from a location outside the scope and which has not yet been decrypted inside the scope, would not yet have been stored in the clear on volatile storage within the scope. Origin metadata 302 may be used to indicate a secret 204 was received from a location outside the scope.

An exposure metadata item 910 indicates whether a respective augmented secret 304 has been copied to a location outside the deployment scope. An item 910 may also indicate whether the secret was encrypted when copied.

An exposure metadata item 912 indicates whether a respective augmented secret has been copied to a removable storage device 914, e.g., a flash drive, memory card, CD, or DVD. An item 912 may also indicate whether the secret was encrypted when copied.

An exposure metadata item 916 indicates whether source code utilizing or invoking a respective augmented secret has been detected. This may be accomplished, e.g., using a tool 122 which scans source code for credential utilization. An item 916 may distinguish, e.g., between a high risk utilization where the secret credential is in the clear or protected only by weak encryption 612, a medium risk utilization where the secret credential is protected by strong encryption, and a low risk utilization where the secret credential is not detected in any of the scanned source code.

An exposure metadata item 918 indicates whether a respective augmented secret resides in a honeypot 920. By design, honeypot secrets do not secure assets whose compromise would be a serious loss. Honeypots are created exclusively as bait for an adversary. Thus, when a honeypot secret is touched (read, updated, or otherwise accessed) they provide an extremely strong signal of a breach attempt. Therefore, the risk rating 410 on these secrets could be considered high (especially for audit-related use cases).

Honeypot secrets 204 may be identical to non-honeypot secrets 204 in terms of format, key length, encryption algorithm, and other characteristics that are visible to an attacker. However, the assets 402 secured by a honeypot secret have low-to-no impact if damaged, exfiltrated, or destroyed, and activities involving access to honeypot assets is more heavily monitored than many (or even all) other access activities in a given environment. To help hide the presence of the honeypot from attackers, any exposure metadata items 918 are either spoofed ("definitely no honeypot here"), or stored well outside the reach of any attackers.

A protection metadata item 1002 indicates whether access to a respective augmented secret 304 is subject to an access control list 1004. Here, as with other accesses to an augmented secret 304, an entire augmented secret (both secret 204 and metadata 302) may be subject to access modulation (e.g., via an ACL 1004), or it may be that only the secret 204 portion of the augmented secret 304 is subject to access modulation.

A protection metadata item 1006 indicates whether access to a respective augmented secret 304 is subject to a secrets manager service 1008.

A protection metadata item 1010 indicates whether access to a respective augmented secret is subject to a hardware-backed key 1012.

A protection metadata item 1014 indicates whether source code utilizing or invoking a respective augmented secret is subject to code review 1016.

A protection metadata item 1018 indicates whether a respective augmented secret is stored in a hardware security module 1020. An item 1018 may also or instead indicate whether the respective augmented secret is stored in a Trusted Platform Module (TPM), or another secure enclave or secure cloud.

A protection metadata item 1022 indicates whether a respective augmented secret is stored in an air-gapped location 1024.

A protection metadata item 1026 contains or otherwise identifies an attestation 1028 that a respective augmented secret 304 is subject to a specified protection (e.g., ACL 1004, encryption 612, audit, secured storage, or any other cybersecurity control now known or hereafter developed). This item 1026 or other protection metadata 718 (or indeed any other risk metadata 302) could be signed by an authority with these representations about protection, exposure, auditing, and so on.

An attestation 1028 may serve to show risk reduction, such as adherence to a security baseline (policy, processes, or tools ensuring secure practices) or use of only a closed ecosystem (hardware or enclave). This attestation 1028 may be considered another example of risk of exposure metadata, e.g., protection metadata 718 or exposure metadata 714.

A protection metadata item 1030 indicates a characteristic 1032 of an entity 1034 which attested to, authenticated, confirmed, validated, or otherwise affirmed a respective augmented secret 304. For example, an item 1030 may indicate that a digital certificate 304, 504 was issued by a particular certification authority, or that a digital signature 304 indicates code was signed 602 by a particular software vendor, in which case the characteristic 1032 is identity. Other characteristics 1032 might indicate, e.g., whether an entity is governmental, local (e.g., same state or province), domestic (in-country), an educational institution, and so on.

A protection metadata item 1036 indicates a characteristic 1032 of an entity 1038 which created, generated, or otherwise originated a respective augmented secret.

A protection metadata item 1040 indicates a characteristic 1032 of an entity 1042 which stored, transmitted, or otherwise possessed a copy of a respective augmented secret 304.

A protection metadata item 1044 indicates a characteristic 1032 of a physical device 102 or a physical facility 1046 which stored, transmitted, or otherwise possessed a copy of a respective augmented secret 304.

A rotation metadata item 1102 represents a last rotation date 1104 or a creation date 1104 for a respective augmented secret 304. This may be implemented as a specific or approximate date, a specific or approximate date with a specific or approximate time, a range of dates, a range of times, or an elapsed period such as a time since creation or days since most recent rotation, for example. For example, a password age may be represented in an item 1102.

A rotation metadata item 1106 represents an expiration date 1108 for a respective augmented secret 304. Many secrets have an expiration time. Some secrets are relatively long-lived, e.g., valid for years, while other secrets have a valid lifespan measured in months or weeks, or less. As with creation and rotation dates 1104 and times 1104 in an item 1102, the expiration date 1108 or expiration time 1108 in an item 1106 may be specific or approximate, absolute or relative, and so on. For example, a certificate time-to-live (TTL) may be represented in an item 1106.

An audit metadata item 1202 indicates whether access to a respective augmented secret 304 is subject to auditing. An auditing extent 1204 may be a Boolean (auditing is on or auditing is off), or it may be more detailed, e.g., to indicate what operations or users are audited.

An audit metadata item 1206 indicates whether access to a respective augmented secret is subject to auditing that is recorded on an immutable storage device 102, 1208.

As noted, a given embodiment may combine various kinds of secrets risk metadata 302. In particular, some embodiments include a plurality of augmented secrets 304, with each augmented secret having respective risk metadata 302 stored in a digital memory 112. In these embodiments, the risk metadata collectively include at least N risk metadata items from the following, where N is in the range from one to ten: zero or more scope metadata 706 items, zero or more impact metadata 710 items, zero or more exposure metadata 714 items, zero or more rotation metadata 720 items, zero or more classification metadata 724 items, zero or more protection metadata 718 items, zero or more audit metadata 722 items, zero or more transitivity metadata 702 items, zero or more risk history metadata 732 items, zero or more strength metadata 730 items, and zero or more identifier metadata 738 items. The "zero or more" indicates that any given kind of metadata is not required for these embodiments, but at least N metadata items of some kind are required for these embodiments. Thus, when N is eight, the requirement of at least eight items could be met by having protection metadata items 1006, 1014, 1022, 1030, and exposure metadata items 904, 910, 912, 916, and no rotation metadata items. Of course, many other combinations are also within the scope of these embodiments.

Other system embodiments are also described herein, either directly or derivable as system versions of described processes or configured media, duly informed by the extensive discussion herein of computing hardware.

Although specific augmented secret architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, mechanisms, controls, operational sequences, data structures, or other functionalities for instance, and may otherwise depart from the examples provided herein.

Processes (a.k.a. Methods)

Figure 13:
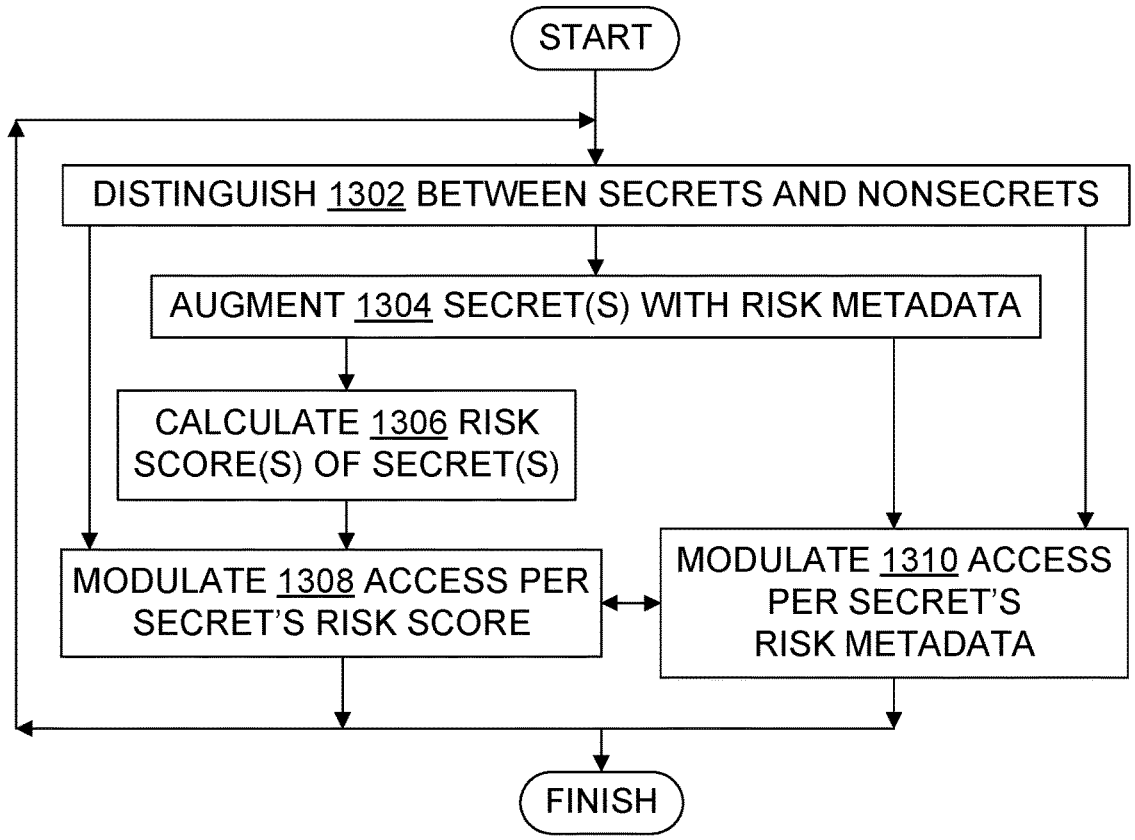
FIG. 13 is a flowchart illustrating steps in some methods for risk-based access to secrets.
Figure 14:
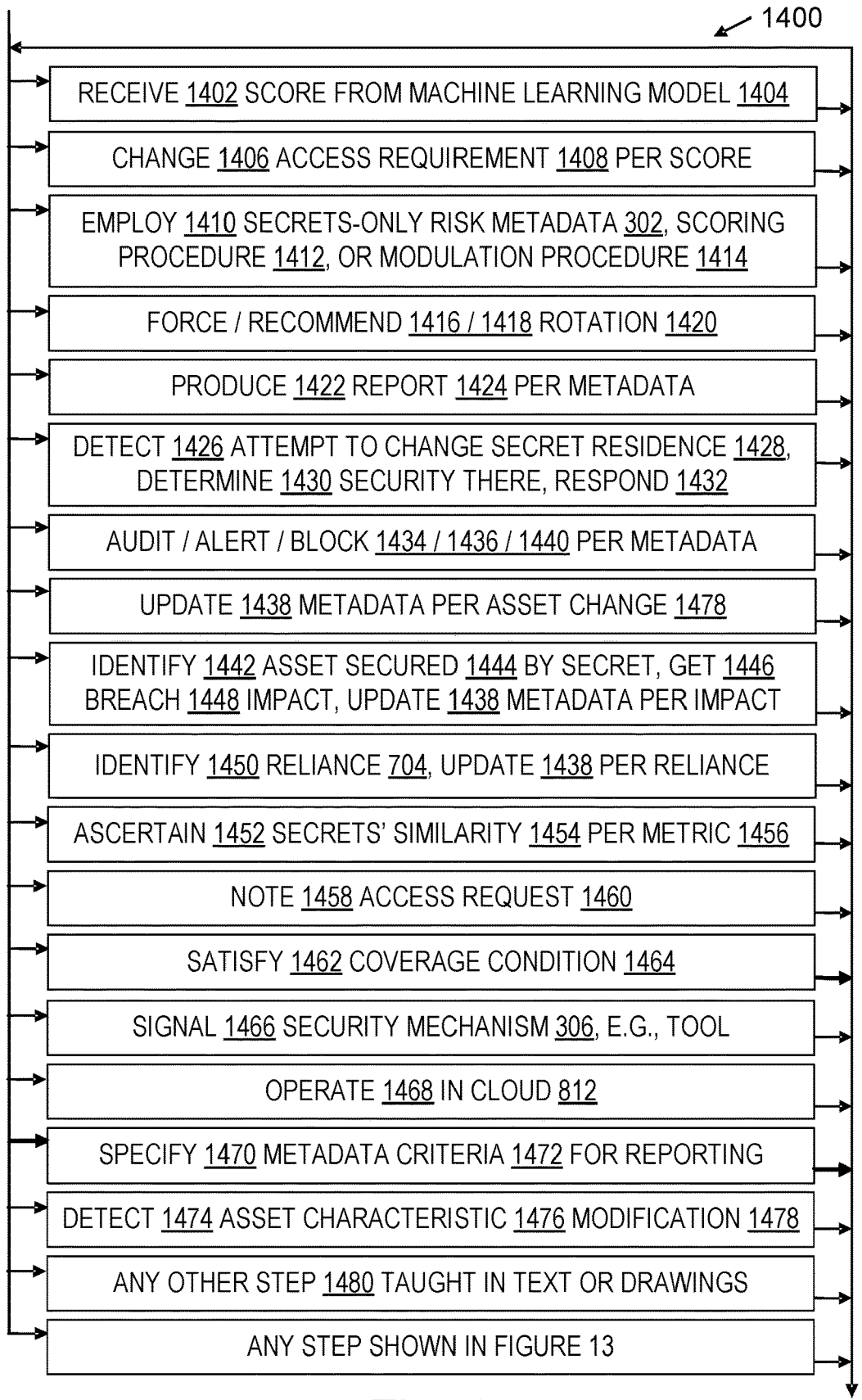
FIG. 14 is a flowchart further illustrating steps in some methods for risk-based access to secrets.

FIG. 13 illustrates a family of methods 1300 that may be performed or assisted by an enhanced system, such as system 400 or another risk-based secrets access functionality enhanced system as taught herein. FIG. 14 further illustrates risk-based secrets access methods (which may also be referred to as "processes" in the legal sense of that word) that are suitable for use during operation of a system which has innovative functionality taught herein. FIG. 14 includes some refinements, supplements, or contextual actions for steps shown in FIG. 13. FIG. 14 also incorporates steps shown in FIG. 13.

Technical processes shown in the Figures or otherwise disclosed will be performed automatically, e.g., by an enhanced security infrastructure, identity manager, or cloud SIEM, unless otherwise indicated. Processes may also be performed in part automatically and in part manually to the extent action by a human administrator or other human person is implicated, e.g., in some embodiments a human asset owner 728 may manually specify a classification value 726, but no process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 13 and 14. Steps may be performed serially, in a partially overlapping manner, or fully in parallel. In particular, the order in which flowchart 1300 action items or flowchart 1400 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method for risk-based access to a secret 204 which is stored as digital data in a computing environment 100, including the following steps: augmenting 1304 the secret 204 with risk metadata 302 which is also stored as digital data in the computing environment; automatically calculating 1306 a risk score 410 for the secret, the calculated risk score based at least on at least a portion of the risk metadata; and computationally modulating 1308 access to the secret 204 based on at least the risk score.

In some embodiments, the method distinguishes 1302 functionally in at least one of the following ways between access to computing system assets which are secrets and access to computing system assets which are not secrets: the secret 204 is augmented with risk metadata 302 which does not augment any computing system asset that is not a secret; the risk score 410 calculating 1306 employs a scoring procedure 1412 which is not employed for scoring risk for any computing system asset that is not a secret; or the secret access modulating 1308 employs a modulating procedure 1414 which is not employed for modulating access to any computing system asset that is not a secret.

In other words, some embodiments distinguish 1302 between secrets and non-secrets in at least one of the following ways: (a) using metadata 302 that is specific to secrets as opposed to non-secrets, (b) using a risk score calculation procedure 1412 that is specific to secrets as opposed to non-secrets, or (c) using an access modulation procedure 1414 that is specific to secrets as opposed to non-secrets. A given embodiment may distinguish 1302 between secrets and non-secrets in one, two, or all three of these ways.

As also discussed elsewhere herein some examples of distinguishing 1302 by option (a) include using, e.g., exposure metadata 714, rotation metadata 720, strength metadata 730, or transitivity metadata 702. These are metadata that within a given environment may well only make good sense with regard to secrets, e.g., asking whether a password is hard to guess (strength metadata) makes a lot more sense than asking whether a web page is hard to guess, and asking whether a TLS certificate has expired (rotation metadata) makes a lot more sense than asking whether a music file has expired.

Some examples of distinguishing 1302 by option (b) include, e.g., using formulas or machine learning models 1404 that are specific to the calculation of a risk score for secrets. For instance, machine learning models could be trained with data about password complexity. Also, a risk formula used for scoring secrets 204 could be different than the risk formula for scoring non-secrets, e.g., scoring secrets 204 might depend on exposure metadata 714 and not depend on IP reputation data whereas scoring non-secrets could be vice-versa.

An example of distinguishing 1302 by option (c) is automatically increasing 1406 authentication or authorization requirements 1408 for accessing a particular secret 204 when transitivity metadata 702 augmenting that secret indicates that access to a cloud-wide asset 402 depends on that secret.

Some embodiments perform or use a secret risk score calculation. One example mechanism for calculating 1306 a risk score 410 of a secret 204 is a machine learning model 1404 that is dependent on secret metadata 302. In some embodiments, calculating a risk score 410 for a secret 204 includes receiving 1402 the risk score from a machine learning model 1404 which was trained using risk metadata 302 which does not augment any computing system asset that is not a secret.

Another example mechanism for calculating 1306 a risk score 410 is a formula or algorithm implementation (referred to as a "scoring procedure" 1412) that is dependent on secret metadata 302. Some examples of such formulas include simple computational statements such as:

risk score=(user-tagged risk)*(normalized number of devices deployed to);

risk score=(number of regions deployed to)*(risk scale factor); or risk score=(number of humans exposed to secret)* (risk factor).

In some embodiments, calculating a risk score 410 for a secret 204 includes employing 1410 a scoring procedure 1412 which depends on at least N of the following: a scope metadata 706 item indicating a deployment scope of the secret, an impact metadata 710 item representing an impact of misuse of data that is subject to protection using the secret, an exposure metadata 714 item indicating at least one known exposure of the secret, a classification metadata 724 item representing a risk classification of the secret, a protection metadata 718 item representing mechanisms or procedures aimed at preventing unauthorized use of the secret, a strength metadata 730 item representing a likelihood of guessing or brute-forcing the secret, an audit metadata 722 item representing auditing of access to the secret, a risk history metadata 732 item representing historic risk to an asset secured by the secret, or a transitivity metadata 702 item representing a dependence between the secret and another secret. Depending on the embodiment, N is a value in the range from one to nine.

In some embodiments, modulating 1308 access to the secret based on at least the risk score includes at least one of the following: increasing 1406 an authentication requirement 1408 for access to an asset 402 that is within the deployment scope of the secret when the risk score meets or exceeds a predetermined threshold; increasing 1406 an authorization requirement 1408 for access to an asset 402 that is within the deployment scope of the secret when the risk score meets or exceeds a predetermined threshold; forcing 1416 or recommending 1418 rotation 1420 of the secret, based at least in part on the risk score; producing 1422 a report 1424 which depends on the risk score; auditing 1434 access to the secret based at least in part on the risk score; or alerting 1436 based at least in part on the risk score. In some embodiments, forcing or recommending rotation of a secret based on the risk score can be done automatically by use of a secrets management distribution service, e.g., a dSMS process or other technology for automatic renewal and distribution of a secret, or by recommending or revoking access automatically using a token or certificate revocation system such as CRL, OCSP, or untrusted lists.

As noted, secrets 204 typically have value that depends on what asset they secure, which is not reliably true of non-secrets because most if not all non-secrets have an inherent value independent of how they are secured. Metadata 302 may reflect this difference. For example, consider a scenario in which a secret 304 secures an extremely valuable data asset 402, so the secret is classified as high risk. Assume the valuable data asset is then entirely deleted, by an intentional authorized deletion. Then the secret is reasonably viewed as no longer deserving a "high risk" classification. In a similar scenario, a passcode secures a lock on a safe that contains diamonds, so the passcode is considered high risk. If all the diamonds are removed and the safe is empty, the passcode is no longer high risk. In a third scenario, a secret which (unsuccessfully) secured a trade secret moves from high risk to no risk, since the value of a published trade secret is essentially zero. In a fourth scenario, a financial account whose value grows past a certain level, thereby triggering an automatic warning to the account's owner that a stronger password or different password or multifactor authentication should now be used. In each of these scenarios, the secret itself is unchanged, but due to changes in the status or nature of what the secret secures, the risk category of the secret should be modified.

In some embodiments, a secret 204 secures an asset, and the method includes detecting 1474 a modification 1478 of a characteristic 1476 of the asset, recalculating 1306 the risk score for the secret, with the recalculated risk score 410 dependent on the asset characteristic modification 1478, and modulating 1308 access to the secret based on at least the recalculated risk score.

In some embodiments, a secret 204 is augmented by one or more of impact metadata 710, scope metadata 706, or classification metadata 724, and the method includes detecting 1426 an attempt to make an instance of the secret reside at a new location, determining 1430 that the new location is less secure than a current location of the secret, and responding 1432 to the determination by performing at least one of the following: blocking 1440 the secret from residing at the new location, alerting 1436, requiring 1406 additional authentication or additional authorization or both before allowing the secret to reside at the new location, or increasing 146 security requirements 1408 or security capabilities 206 or 306 or both at the new location.

In some embodiments, automatically calculating 1306 a risk score for a secret includes identifying 1442 an asset that is secured by the secret, getting 1446 an impact value 712 representing a breach 1448 of security due to compromise of the secret, and calculating 1306 the risk score for the secret based at least in part on the impact value.

In some embodiments, automatically calculating 1306 a risk score for the secret includes identifying a security reliance 704 of a second secret on the secret, such that the second secret is secured at least in part by the secret, and calculating 1306 the risk score for the secret based at least in part on the security reliance.

In some embodiments, a method also includes at least one of the following: computationally ascertaining 1452 whether two secrets are similar according to a specified similarity metric 1456, reporting 1422 which secrets have a specified risk score, reporting 1422 which assets are secured by a secret which has a specified risk score, reporting 1422 which access attempts include a secret having a specified risk score, reporting 1422 which users are authorized to utilize a secret having a specified risk score, or reporting 1422 changes in a secret's risk score. In this context, having "a specified risk score" means having a specified exact value, or being within a specified tolerance or another specified range.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as secrets risk metadata 302 (which are data structures), risk-based secret access software 408 such as scoring procedures 1412 or modulation procedures 141 or both, other software 408 which conforms with FIG. 13 or FIG. 14 or both, enhanced security controls 306, and secrets' risk scores 410, in the form of data 118 and instructions 116, read from a removable storage medium 114 and/or another source such as a network connection, to form a configured storage medium. The configured storage medium 112 is capable of causing a computer system 102 to perform technical process steps for risk-based secret access management, as disclosed herein. The Figures thus help illustrate configured storage media embodiments and process (a.k.a. method) embodiments, as well as system and process embodiments. In particular, any of the process steps illustrated in FIG. 13 or 14, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform a method for risk-based access to secrets which are stored as digital data in a computing environment. This method includes: automatically noting 1458 a request 1460 to access an augmented secret 304 or an asset 402 secured using the augmented secret, or both, wherein the augmented secret includes a secret 204 which is augmented with risk metadata 302, and computationally modulating 1310 access to the augmented secret or to the asset secured using the augmented secret, or both, based on at least a portion of the risk metadata.

In some embodiments, enhancements implementing risk-based access to secrets can be helpful (e.g., increase efficiency, effectiveness, consistency, and reliability) even if they are implemented in only part of an environment, e.g., only to protect particularly powerful secrets.

Some embodiments are characterized by satisfying 1462 at least one of the following coverage conditions 1464. Although the particular cutoffs 90% and 50% are listed in these examples, other cutoff may also be used, e.g., 80% or 70% in place of 90%, and 60% or 40% in place of 50%.

Coverage Condition A. At least 90% of secrets which secure accounts in the computing environment having elevated privilege are augmented secrets having respective risk metadata. For example, an embodiment may have 90% of admin passwords or similar secrets augmented 1304, when admin account passwords are secrets which secure accounts that have elevated privilege.

Coverage Condition B. At least 90% of secrets which secure accounts in the computing environment having virtual machine deployment capability are augmented secrets having respective risk metadata.

Coverage Condition C. At least 90% of secrets which secure one or more assets in the computing environment having access to management credentials are augmented secrets having respective risk metadata. Such management credentials may include, e.g., root or region-wide or cloud-wide or hypervisor management certificates, tokens, or keys.

Coverage Condition D. At least 90% of secrets which secure multiple accounts in the computing environment are augmented secrets having respective risk metadata. Admin account passwords are secrets which transitively secure multiple accounts, for example. Unchanged default passwords and other passwords that are re-used for multiple accounts are also secrets which secure multiple accounts.

Coverage Condition E. At least 90% of secrets which secure one or more assets accessible to multiple accounts in the computing environment are augmented secrets having respective risk metadata. For example, passwords or management credentials for storage access may secure assets such as hard drives that are accessible multiple accounts.

Coverage Condition F. All secrets which reside in a specified honeypot 920 are augmented secrets having respective risk metadata.

Coverage Condition G. All secrets which have a specified deployment scope 708 are augmented secrets having respective risk metadata.

Coverage Condition H. At least 50% of passwords or pass phrases in the computing environment are augmented secrets having respective risk metadata. In this situation, at least half of all passwords, including non-admin user passwords, are augmented with risk metadata.

In some embodiments, the method also includes at least one of the following: reporting 1422 who has direct access to any augmented secret whose respective risk metadata meets specified 1470 criteria 1472 (e.g., identify in a report who can access secrets with a region-wide scope, or who can access a secret that is currently deployed on at least ten virtual machines); reporting 1422 who has indirect access to any augmented secret whose respective risk metadata meets specified 1470 criteria 1472 (an example of indirect access is an ability to elevate privilege to gain access with one click or via a Just-in-Time access system or by deploying a service to gain access to its secrets); reporting 1422 any augmented secret whose respective risk metadata meets specified 1470 criteria 1472 (e.g., report which augmented secrets have been copied to any removable medium, or which augmented secrets are not in any key vault, or which secrets have had a risk score increase in the past six hours).

Some embodiments provide alerts, machine learning inputs, or other signals 1466. In some embodiments, a method includes at least one of the following: signaling 1466 a dynamic authorization mechanism in response to risk metadata of an augmented secret (e.g., signal a just-in-time deployment system); signaling 1466 a SIEM 122 in response to risk metadata of an augmented secret; signaling 1466 a secret revocation system (a system for revoking a secret) or a secret rotation system in response to risk metadata of an augmented secret; signaling 1466 a threat detection system 122 in response to risk metadata of an augmented secret; or signaling 1466 an intrusion detection system 122 in response to risk metadata of an augmented secret.

In some embodiments, the computing environment 100 is a cloud computing environment, while in others, no cloud 812 is part of the computing environment 100.

Additional Examples and Observations

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered.

As a general principle, a person responsible for cybersecurity policy or implementation, such as an organizations' insider and adversarial threat mitigation strategy, seeks to know the relevant people and assets. As explained herein, secrets 204 are a special case of an asset which warrants careful attention. There are some measures in place to identify users with access to resources via standing access or Just-in-Time (JIT) policies for access elevation, and in some installations such identification extends indirectly to secrets by way of role-level access classification. In some installations, any non-compliant policy in JIT will be flagged as a part of a security baseline or policies. Additionally, some installations have audit and log coverage, and some have threat detection or other anomaly detection.

However, there are gaps that present significant risks with little or no coverage. Secrets are typically all treated with the same risk level. Secrets can be accessed outside a secrets manager, especially via service deployments. ACL's on secrets are typically coarse-grained and not well understood by the personnel that interact with them. Accordingly, in addition to running with least-privilege, reducing surface area, and improving op-sec hygiene, it would be beneficial to understand, track, and control access to secrets based on risk wherever they reside. Tools and techniques taught herein provide capabilities for effective reporting and alerting specific to secrets' risks, as well as use as signal for systems that elevate or decrease access level automatically based on risk.

Risk is commonly defined in terms of likelihood and impact. GDPR classifies data to allow for policy-based decisions and actions. Secrets have not had similar ratings, but with the guidance of teachings herein secrets can be rated 1308 based on their damage potential 712, scope (e.g., 708, 806, 814, 822, 826, 836, 840), or access controls (e.g., 1004, 1008, 1012, 1016, 1020, 1024, 1028). Pursuant to these teachings, access may be modulated 1308, 1310 based on insights such as the following.

Not all secrets are created equal. A secret may be used to encrypt high business impact customer data or to control access to benign user preferences.

Secrets have scope. The blast radius of a secret may be at the cloud level or an individual VM. Many highly publicized security incidents are harsh reminders.

Secrets can be shared. Whether directly referenced in a service model or copied to a USB drive, secrets, like data, can be shared for legitimate reasons, which vastly increases risk.

Secrets provide value from being used. Services or humans decrypt or gain access to secrets so the secrets can be used. Secrets are sometimes in the clear in memory, stored unprotected on disks, or trivially extracted by admins, to permit their use.

In many installations, secrets are accessed most often in one of the following ways: from configuration files checked into source repositories, via standing access in a secrets manager or resource manager, via JIT access in a secrets manager or resource manager, or by run-time access during or post deployment.

The last one, run-time access during or post deployment is complicated and as a result, extremely dangerous. Within it, there are at least three scenarios: secrets exposed to deployment systems, secrets stored on disk or used in the clear by services, and services with overprovisioned access to secrets in a secrets manager or resource manager.

Each of these scenarios may benefit from teachings provided herein. For example, a secrets manager or resource manager or credential scanner may be enhanced to recognize, add, or update secrets risk metadata 302, while trying to ensure that all secrets are encrypted or otherwise not present in the deployment tools. Protection metadata 718 may be created and updated by controls 306, to indicate whether encryption at rest, confidential computing (enclaves, HSM's, and the like), or other protections are in place.

Teachings may also be applied beneficially when services have extremely coarse-grained or otherwise overprovisioned access to secrets. This may occur due to complexities in ACL'ing secrets in secrets managers, weak service identity, and a lack of understanding of risks from service developers.

For example, a rogue insider may deploy a cloud hosted service (e.g., PaaSv1) which references a management certificate granting access to all storage accounts across an entire cloud, including all third-party customers. In this example, without explicit monitoring at the app-level or OS-level and in the absence of secrets risk metadata 302 and enhanced controls 306, the adversary gains access to all accounts without tripping any alarm bells on the secret itself. Without the teachings herein, the only guard-rails are during code review of the check-in (such as reviewing the service model). If is missed in the code review process or the code review is bypassed entirely, it is trivial to extract the secret via code, or directly on the machine, undetected.

In a hypothetical ideal environment, secrets are generated directed in secure enclaves only as needed and are leveraged by services indirectly as needed. But in practice, secrets 204 are often generated with broad scope, or are shared and distributed across a variety of regions, clusters, services, or nodes out of convenience. Thus, a compromise of one node or other usage location results in the compromise of all locations using the secret. Implementation of global services, region-wide certificates, and other widely distributed secret-using features make this vulnerability-through-breadth a common problem which is difficult to avoid. Managing thousands of secrets is a similarly difficult problem. Eliminating secrets by adopting standard authentication protocols may reduce complexity. However, surfacing risks in the form of secrets' scope and secrets exposure (and other metadata 302) provides strong signals for use in detections and risk-based systems that automatically adapt security to changing conditions.

Risk-based access to secrets helps tools 122, and their cybersecurity users, better understand who has access to secrets. This is accomplished, for example, by querying metadata 302 per specified criteria 1472 and using the query results to provide 1422 clear reports on who has access to which secrets. Reported access capabilities may include direct access to secret managers or standing access, as well as access via subscriptions or deployments. Such reporting enables detections based on secrets' risk combined with organization distance, user risk, or other asset risk. An enhanced system 400 could also leverage risk metadata 302 to calculate risk scores for secrets that serve as a signal for JIT security controls to perform step-up access approvals with comprehensive risk ratings. For example, cloud portal access requirements could be heightened due a determination that high-risk secrets are associated with a subscription, e.g., to force a policy that is auto-approve by default to require manual approval from the subscription owner.

As an architectural example, some embodiments augment classic data sources by secrets inventory metadata. The classic data sources represent, e.g., asset 402 data, user 104 data (e.g., user account, user role, user identity), and secrets 204 data. Sources such as secrets management services, key vaults, service tree APIs, service identity metadata APIs, and subscription owner data APIs may be used. Optionally in these embodiments, manual classifications 726 of secrets 204, assets 402, or users 104 is also input to a risk-based system 400 for access to secrets 204. Secrets risk 410 is calculated, and conflated with other user, asset, and risk metadata. Risk scores 410 are then leveraged by a variety of security systems for access and audit, e.g., through access reports, access control, threat hunting, and detections. Scores 410 may be provided through a feed to a SIEM, threat detection tool, or as responses to on-demand queries using Kusto query language or another data explorer or query language.

In some embodiments, these new capabilities provide simple, critical security capability for a cloud computing environment 100. Secrets risk metadata 302 is calculated or otherwise obtained based on secrets inventory, deployment inventory, and subscription ownership, or similar sources. Secret scope metadata 706 is generated from a secrets 204 and deployment inventory, using Kusto or similar inventory query functionality. Secret exposure metadata 714 is generated from IfxAudit™ or similar data or security auditing software development kit (SDK) or system, or dSMS™ secrets exposed metadata or the like, or both. The IfxAudit™ technology includes an application security audit solution that provides immutable audit logs. Service owner risk classification 726 metadata 724 is generated from dSMS™ and Azure® Key Vault™ or similar data sources enhanced to allow secret risk classification as metadata and manual tagging (e.g., on a Storage Admin Key). Secrets risk scores 410 are joined with user and asset metadata to provide access feeds for use in tools such as an Azure® Sentinel® SIEM or other cloud SIEM, Intelligent Threat Detection™ or other detection tools 122, Intelligent JIT™ or other dynamic access requirement tools 122 for risk-based access control, and ad-hoc Kusto™ or other data explorer queries and query tools 122, for threat hunting and forensics (marks of Microsoft Corporation).

More generally, although many of the examples used herein involve a cloud or other distributed computing environment, teachings herein can also be applied on a system 400 as small as a single computing device, e.g., a single tablet or laptop. It will also be recognized, in view of the teachings herein, that secrets 204 can be stored in multiple places, and metadata 302 may be stored separately from secrets, e.g., in different files or in a repository indexed by secret hashes, yet nonetheless operate together to form an augmented secret data structure 304.

As a further illustration of enhanced approaches in comparison to other approaches, one of skill will acknowledge that a system or service that has access to a secret 204 may extract a secret (without exposure to any human) and deploy that secret to a location with lesser security controls. Without the protective benefit of teachings herein, a human bad actor may thus have the access required to do this deployment and also have sufficient access to the lower-privileged system the secret was deployed to.

In particular, consider a scenario for gaining access to dSMS™ Secrets via service deployment. Services in dSMS use Service Tree IDs or Subscriptions to authorize release of secrets in deployment, e.g., through allow-listing (sometimes called "whitelisting"). The Service Tree ID allow-list is an access control enforced by dSMS or other service to primarily track ownership of secrets created in dSMS or other service. This allow-list is applied on a root-folder and is inherited by all secrets that are created under that folder path. A team can have multiple root folders tagged with the same Service Tree ID but cannot have the same root folder tagged with multiple Service Tree IDs. This allow-list is used to track ownership and will reflect in Microsoft's S360™ dashboard (marks of Microsoft Corporation).

Subscriptions or Service Tree IDs are ACL'd to a path, which is typically the root (e.g., /storage), via build-out automation or dSCM. Subscriptions and Service Tree IDs may span several services or teams and are typically coarse-grained. The fact that they are ACLs to the root further broadens access (intentional or unintentional), as multiple humans and services may use the same paths or secrets.

Given that Subscription and Service Tree IDs may be GUIDs or similar non-human-readable identifiers, and that large services like SQL have hundreds of thousands of Subscriptions, tracking each access is not feasible. As a result, Subscription approvals have sometimes either been rubber-stamped (approved with little or no prior investigation) or automated away without auditing.

Under one attack scenario, an adversary takes over an Azure® employee user account. That user has access to a Subscription that has access to Storage Management Certificate ABC. The adversary deploys a new Cloud Hosted Service, referencing that secret, to a VM. Then the adversary uses Remote Desktop Protocol to access the VM, and extracts the secret from the Windows® Cert Store using the Mimikatz security tool (Azure and Windows are marks of Microsoft Corporation).

However, in an enhanced system 400 the initial elevation to access the Subscription would be flagged as higher risk due to its ability to access the Storage Management Certificate ABC. This would allow for the system 400 to require additional approvals for deployment, or higher auditing levels, or even fail the deployment if the Subscription's risk rating is lower than the secret's rating. To support metadata 302 creation and use, deployment subscriptions for dSMS or the like could be added via a dSCM Portal or a similar interface.

Additional support for the discussion above is provided below. For convenience, this additional support material appears under various headings. Nonetheless, it is all intended to be understood as an integrated and integral part of the present disclosure's discussion of the contemplated embodiments.

Technical Character

The technical character of embodiments described herein will be apparent to one of ordinary skill in the art, and will also be apparent in several ways to a wide range of attentive readers. Some embodiments address technical activities such as augmenting secrets 204 with metadata 302 by creating and populating augmented secrets 304 (which are data structures configuring memory 112), calculating risk scores 410 of secrets 204, 304, computationally modulating 1308 access to secured assets 402 based on risk scores 410, and computationally modulating 1308 access to secured assets 402 based on risk metadata 302 generally (as opposed to risk scores 410 in particular), which are each an activity deeply rooted in computing technology. Some of the technical mechanisms discussed include, e.g., enhanced security controls 306, risk-based secret access software 408, encryption algorithms 508, 510, risk transitivity dependences 704, metadata 302, immutable devices 1208, scoring procedures 1412, modulation procedures 1414, and security mechanisms 306. Some of the technical effects discussed include, e.g., an enhancement capability to elevate 1406 access requirements 1408 based on a difference in risk level between access to secret deployment services and access to deployed secrets 204, reporting 1422 capabilities that reveal who has access to which secrets 204, automatically enhanced security 306 for secrets that protect other secrets (via transitivity metadata 702 usage), and identification of security vulnerabilities via analysis of exposure metadata 714, risk history metadata 732, protection metadata 718, strength metadata, scope metadata 706, or risk scores 410. Thus, purely mental processes and activities limited to pen-and-paper are clearly excluded. Other advantages based on the technical characteristics of the teachings will also be apparent to one of skill from the description provided.

Some embodiments described herein may be viewed by some people in a broader context. For instance, concepts such as availability, confidentiality, data integrity, efficiency, privacy, or reliability, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to automatically and effectively identify and mitigate cybersecurity vulnerabilities that arise from incomplete or inconsistent protection of secrets 204. Other configured storage media, systems, and processes involving availability, confidentiality, data integrity, efficiency, privacy, or reliability are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants.

Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples, operating environments, time period examples, software processes, security tools, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.
ACL: Access Control List
AES: Advanced Encryption Standard
AKV: Azure® Key Vault (mark of Microsoft Corporation)
ALU: arithmetic and logic unit
API: application program interface
BIOS: basic input/output system
CD: compact disc
CPU: central processing unit
CRL: certificate revocation list
dSCM: Datacenter Security Configuration Manager
dSMS: Datacenter Secrets Management Service
DVD: digital versatile disk or digital video disc
FPGA: field-programmable gate array
FPU: floating point processing unit
GPU: graphical processing unit
GUI: graphical user interface
GUID: globally unique identifier
HIDS: host intrusion detection system
HTTP(S): hypertext transfer protocol (secure)
IaaS or IAAS: infrastructure-as-a-service
ID: identification or identity
ITD: Intelligent Threat Detection
IoT: Internet of Things
IP: internet protocol
JIT: Just-in-Time
LAN: local area network
NIDS: network intrusion detection system
OCSP: online certificate status protocol
OS: operating system
PaaS or PAAS: platform-as-a-service
PKI: public key infrastructure
RAM: random access memory
ROM: read only memory
SIEM: security information and event management; also refers to tools which provide security information and event management
SQL: structured query language
SSL: secure sockets layer
STS: Security Token Service
TCP: transmission control protocol
TLS: transport layer security
TPU: tensor processing unit
UDP: user datagram protocol
UEFI: Unified Extensible Firmware Interface
URI: uniform resource identifier
URL: uniform resource locator
USB: universal serial bus
VM: virtual machine
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, "secret risk metadata" means risk metadata that is functionally associated with one or more secrets, as opposed to meaning, e.g., metadata about a secret risk, or risk metadata that is a secret. "Risk metadata" is metadata about one or more risks. "Risk" refers to a potential for loss or harm. "Risk" may also be defined as a likelihood of loss or harm multiplied by the impact if the loss or harm actually occurs. "Metadata" is a particular kind of data 118, namely, data about other data.

A "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

An "administrator" (or "admin") is any user that has legitimate access (directly or indirectly) to multiple accounts of other users by using their own account's credentials. Some examples of administrators include network administrators, system administrators, domain administrators, privileged users, service provider personnel, and security infrastructure administrators.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing or data generation or actuator nodes. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Access "modulation" means performing one or more of the following in conjunction with, or as a precondition of, or in response to, a request or other attempt to access a secret or another asset: alerting, altering, auditing, authenticating, authorizing, blocking, delaying, invoking a security control, limiting, managing, moving, logging, reconfiguring, reporting, restricting, securing, or another operation taught herein. Modulation is performed computationally, e.g., not by operation of law or by persuasive oratory.

"Misuse" of an asset includes any improper or unauthorized use, including in particular any uses that violate the confidentiality, integrity, availability, or privacy of data.

"Secured" means only that some security is provided, not that the effectiveness of the security is guaranteed.

Metadata regarding a "respective augmented secret" means that a secret is augmented with the metadata in question. That is, the metadata is respective in that it pertains to the secret.

"Metadata" includes both the singular and the plural, for convenience (no use of "datum" as a singular is relied on herein to describe an embodiment).

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations (which are assumed to include dozens of secrets 204 or assets 402, if not thousands). Risk-based secrets access operations such as gathering values to populate metadata 302, augmenting 1304 secrets 204 with metadata 302 to form augmented secrets 304 (which are data structures in memory 112), calculating 1306 risk scores 410 based on metadata 302, modulating 1308, 1310 access to assets in a computing system 102, and many other operations discussed herein, are understood to be inherently digital. A human mind cannot interface directly with a CPU or other processor, or with RAM or other digital storage, to read and write the necessary data to perform the risk-based secrets access steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/ or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as alerting, ascertaining, auditing, augmenting, calculating, changing, detecting, distinguishing, employing, forcing, getting, identifying, modulating, noting, operating, producing, receiving, recommending, satisfying, signaling, specifying, updating (and alerts, alerted, ascertains, ascertained, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as a "computational system" or "computing system", and when in a network may be referred to as a "node"
104 users, e.g., user of an enhanced system 400
106 peripherals
108 network generally, including, e.g., LANs, WANs, software-defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or nonvolatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, and so on
124 applications, e.g., word processors, web browsers, spreadsheets, games, email tools, commands
126 display screens, also referred to as "displays"
128 computing hardware not otherwise associated with a reference number 106, 108, 110, 112, 114
202 user-generated data which has value in and of itself, as opposed to having value only as a secret that secures other data
204 secret, namely, data that secures other data
206 security control, e.g., tools, tactics, or other safeguards or countermeasures to avoid, detect, limit, recover from, or otherwise mitigate impact from accidental or intentional threats to availability, confidentiality, integrity, privacy, or other valued aspects of an asset 302 secret risks metadata, e.g., data about a secret and one or more risks the secret faces or contributes to directly or indirectly 304 augmented secret, namely, a data structure representing a secret and risk metadata about the secret 306 enhanced security control, e.g., a security control which creates or utilizes secret risks metadata 400 enhanced system, e.g., a system 102 enhanced with at least one of the following: secret risks metadata, an enhanced security control, risk-based secret access software, or another functionality first taught herein, or which computationally performs a method according to FIG. 13 or FIG. 14

402 may refer to any asset, which is any resource or item of value within a system 102, but refers to secured assets unless otherwise indicated; some examples of assets include servers, workstations, virtual machines, software, documents, IP addresses, bandwidth, storage, kernels and capabilities managed by kernels, peripherals and other machines controlled through an API or interface to a network, and secrets 404 secured data asset, as opposed e.g., to secured hardware asset 406 interface to a system; may include, e.g., shells, graphical or other user interfaces, network addresses, APIs, network interface cards, ports 408 risk-based secret access software, e.g., software which computationally performs a method according to FIG. 13 or FIG. 14

410 risk score; may also be referred to as a "risk level" or "risk category"; may be exact or approximate, may be numerical or an enumeration value such as "high", may be a single value or a range of values 502 password or pass phrase 504 digital certificate 506 private key of a key pair 508 symmetric encryption algorithm, e.g., AES 510 asymmetric encryption algorithm, e.g., Rivest Shamir Adleman 512 key used in symmetric encryption or decryption 514 key used in asymmetric encryption or decryption 516 key used for digital signing 518 key or other parameter used in encryption 520 key or other parameter used in decryption 522 key used for authentication 524 digital representation such as a hash, or other data structure representing biometric data 526 biometric data 528 key used by application program 530 shared access signature, e.g., digitally signed URI 532 bearer token; may also be referred to as an "access token"; typically is digitally signed and used for authentication or authorization or both 534 connection string, e.g., string that identifies a database or feed or other data source and specifies how to connect to the data source 536 login credential, e.g., username, password, or access token 602 act of digital signing or resultant digital signature (which may also be referred to as an "electronic signature")

604 authorization (as an act or as an item used in such act)

606 authentication (as an act or as an item used in such act)

608 access (as an attempt, or as a result of a successful attempt)

610 decryption (as an act, or as a result of such act)

612 encryption (as an act, or as a result of such act)

614 validation (as an act, or as a result of such act)

702 transitivity metadata (a data structure)

704 dependence or reliance of one secret upon another, as represented in a data structure or other software 706 scope metadata (a data structure)

708 deployment scope of a secret or a secured asset, as represented in a data structure or other software 710 impact metadata (a data structure)

712 impact (actual or projected or potential, exact or approximate) of misuse of an asset 714 exposure metadata (a data structure)

716 exposure of a secret 718 protection metadata (a data structure)

720 rotation metadata (a data structure)

722 audit metadata (a data structure)

724 owner-defined risk classification metadata (a data structure)

726 owner-defined risk classification (value or other data structure)

728 owner of a secret for purposes of risk classification; presumed to be a human but in some embodiments could be a tool 122, e.g., a SIEM or a machine learning model 730 strength metadata (a data structure)

732 risk history metadata (a data structure)

734 risk history trend including prior history of risk levels or metadata 736 risk history projection of future risk levels or metadata; e.g., projection or future risk may reflect an insurance valuation or depreciation; this may be particularly helpful for characterizing secrets that are expected to rise in risk over time and therefore should be initially stronger to ensure they are not compromised early on when the risk is low and used by an adversary later when the risk is higher 738 identifier metadata, e.g., a hash or GUID or other data structure identifying a particular secret or set of secrets relative to other secrets 802 metadata data structure which represents deployment scope in terms of virtual machines 804 virtual machine 806 deployment scope in terms of virtual machines 808 metadata data structure which represents deployment scope in terms of cloud regions 810 cloud region 812 cloud; may also be referred to as "cloud environment" or "cloud computing environment"

814 deployment scope in terms of cloud regions 816 all regions of a cloud; deployment scope which includes all regions of a cloud 818 metadata data structure which represents deployment scope in terms of hosts 820 host; may also be referred to as "host computer" in a network; may refer, e.g., to one or more client computers, peer computers, server computers, or a combination thereof 822 deployment scope in terms of hosts 824 metadata data structure which represents deployment scope in terms of services that use replicas 826 service that uses replicas; also referred to as "replicated service"

828 deployment scope in terms of replicated services 830 metadata data structure which represents deployment scope in terms of a characteristic of an asset, e.g., all routers, all systems running a foobar kernel, all assets installed or modified within the past six months, and so on 832 characteristic of an asset, e.g., asset type or category, asset software installed, asset installation or update or other date, asset value, asset owner, asset risk level, or any other characteristic discussed herein or familiar to one of skill 834 scope metadata data structure which represents deployment scope of an asset 836 deployment scope of an asset, as opposed to deployment scope of a secret 838 scope metadata data structure which represents sharing extent of a secret 840 sharing extent of a secret, e.g., in terms of any measure usable as a deployment scope of a secret or a deployment scope of an asset 902 exposure metadata data structure which represents exposure of a secret in the clear to a human; could be a particular human or one whose presence is inferred, or could represent a more-likely-than-not likelihood that a human could see or print or copy the secret in the clear (i.e., in non-encrypted non-hashed legible form)

904 exposure metadata data structure which represents exposure of a secret by way of a network transmission in the clear 906 exposure metadata data structure which represents exposure of a secret by way of the secret being stored in the clear in nonvolatile memory 908 exposure metadata data structure which represents exposure of a secret by way of the secret being stored in the clear in volatile memory 910 exposure metadata data structure which represents exposure of a secret by way of the secret being copied to a location outside a security perimeter, e.g., outside the reach of any security control deployed in the computing environment from which the secret was copied; e.g., the secret may have been copied to a removable device which was then removed, or transmitted by email to an outside recipient, or exfiltrated by another mechanism 912 exposure metadata data structure which represents exposure of a secret by way of the secret being copied to a removable device 914 removable device, e.g., thumb drive, CD, DVD, memory card, tape cassette 916 exposure metadata data structure which represents exposure of a secret by way of the secret being used or invoked in source code 918 exposure metadata data structure which represents exposure of a secret by way of the secret being placed in a honeypot, or accessible through a honeypot, or used to secure a honeypot asset 920 honeypot 1002 protection metadata data structure which represents protection of a secret by way of an access control list 1004 access control list 1006 protection metadata data structure which represents protection of a secret by way of a secrets manager or secrets management service 1008 secrets manager or secrets management service 1010 protection metadata data structure which represents protection of a secret by way of a hardware-backed key 1012 hardware-backed key, e.g., a dongle, hardware key, or USB key 1014 protection metadata data structure which represents protection of a secret by way of a code review process or requirement 1016 code review; may be manual or fully automatic or both 1018 protection metadata data structure which represents protection of a secret by way of a hardware security module 1020 hardware security module 1022 protection metadata data structure which represents protection of a secret by way of air-gapping 1024 air-gapping; may also refer to an air-gapped system 1026 protection metadata data structure which represents protection of a secret by way of an attestation 1028 attestation data structure; may be digitally signed 1030 protection metadata data structure which represents protection of a secret by way of a characteristic of an affirming entity 1032 data structure representing a characteristic of an entity, e.g., trust level, reputation, years established, whether a contractual party with an implied or stated other party, or any other characteristic relevant to security or business 1034 affirming entity, e.g., legal entity (as represented in a data structure) which affirms a protection is in place or is effective or both 1036 protection metadata data structure which represents protection of a secret by way of a characteristic of an originating entity 1038 originating entity, e.g., legal entity (as represented in a data structure) which created, generated, or otherwise originated a secret 1040 protection metadata data structure which represents protection of a secret by way of a characteristic of a possessing entity 1042 possessing entity, e.g., legal entity (as represented in a data structure) which stored, transmitted, or otherwise possessed a copy of a secret 1044 protection metadata data structure which represents protection of a secret by way of a characteristic of a device or facility 1046 facility, e.g., datacenter, building, campus, store, or other physical container of a secured asset 1102 rotation metadata data structure which represents rotation of a secret by way of a rotation date or a creation date 1104 rotation date or a creation date (data structure); may be exact or approximate or a range 1106 rotation metadata data structure which represents rotation of a secret by way of an expiration date 1108 expiration date (data structure); may be exact or approximate or a range 1202 audit metadata data structure which represents audit of a secret by way of an audit extent 1204 audit extent (data structure), e.g., an audit status or audit capability or audit history 1206 audit metadata data structure which represents audit of a secret by way of an audit extent recorded, recording, or to be recorded on an immutable device 1208 immutable device; may also be referred to as "immutable storage"

1300 flowchart; 1300 also refers to risk-based secrets access methods illustrated by or consistent with the FIG. 13 flowchart 1302 distinguish functionally between access to secrets and access to non-secrets, e.g., by creating or using (or both) metadata 302 that applies specifically to secrets rather than non-secrets; performed computationally as opposed to by mere mental steps 1304 augment secrets 204 by associating them with metadata 302, thereby forming augmented secret data structures 304; performed computationally 1306 calculate a secret's risk score; performed computationally; in some embodiments, the score is precomputed and stored with the secret, while in others the score is generated on-demand based on current or historic context from a secret risk-generation system or oracle (e.g., a secret store, a machine learning model)

1308 modulate access based on at least one secret risk score 410; performed computationally; since a risk score 410 is an example of secret risk metadata 302, step 1308 is an example of step 1310 which effects a modulation 600

1310 modulate access based on at least one secret risk metadata 302 data structure (possibly but not necessarily a risk score 410); performed computationally; step 1308 or 1310 to effect a modulation 600 may include, e.g., (a) reporting an attack in a text message, email, generated-voice message, printout, alert, screen display, or other communication to an administrator or to security personnel or both, (b) triggering defense, e.g., by making a remote procedure call, or by sending a message, signal, or other digital action or communication to a tool such as an intrusion prevention system, firewall, or exfiltration prevention tool in order to request (as a possible action or as a command) that the triggered tool impose an access restriction, (c) imposing an access restriction, (d) locking an account, (e) blocking a location, e.g., an IP address or device or geolocation, (f) requiring additional authentication before permitting access, e.g., a one time password (OTP) sent by text message or email or generated by an authenticator app, or a biometric credential such as a fingerprint scan result, voiceprint, face recognition, or iris scan result, or a verified presence of a hardware token, or a digital token or certificate, or (g) taking any other computational action identified herein as application of a security enhancement or an attack defense 1400 flowchart; 1400 also refers to risk-based secrets access methods illustrated by or consistent with the FIG. 14 flowchart (which incorporates the steps of FIG. 13)

1402 receive a risk score 410 or risk score component data from a machine learning model; performed computationally 1404 machine learning model; may be based on supervised or unsupervised learning; may be used, e.g., to calculate a risk score 410 or to determine whether to change 1406 access requirements 1406 change access requirement; performed computationally not manually 1408 access requirement, e.g., authentication or authorization credentials required or procedures that must be completed successfully to gain access to an asset 1410 computationally employ secrets-risk-metadata-based functionality, e.g., secret risk metadata 302, scoring procedure 1412, or modulation procedure 1414

1412 secrets risk scoring procedure, e.g., software which produces a risk score 410

1414 modulation procedure which uses secret risk metadata 302

1416 computationally force a password update or other secret 204 update 1418 computationally recommend a password update or other secret 204 update 1420 rotation (e.g., replacement or update or revocation) of a secret; performed computationally 1422 computationally produce a report; producing a report may also be referred to as "reporting"

1424 report (e.g., data structure or printout or audible report) containing information about a computing environment 1426 computationally detect an action that may change where a secret resides, e.g., by moving the secret or making a copy of the secret 1428 secret residence, namely, the one or more locations in a computing system where an instance of a secret 204 resides by virtue of configuring memory 112

1430 computationally determine security controls which effectively exist (or do not exist, or may exist) at a location in a computing system 1432 computationally respond to a change or potential change in a secret's residence, through modulation 1308 or 1310

1434 computationally audit access to a secret 1436 computationally raise an alert regarding or in response to a secret or secret risk metadata 1438 update a secret risk metadata value or location 1440 computationally block access to an asset; this is an example of modulation 1442 computationally identify an asset, e.g., by GUID, location, owner, name, or another characteristic 1444 secure an asset, e.g., by conditioning access to the asset on one or more security controls 1446 computationally get impact of a breach 1448 breach (act or result of act), e.g., unauthorized access to an asset 1450 computationally identify a reliance 704, e.g., by noting that one password uses a reset mechanism that is secured by another password 1452 computationally ascertain an extent to which two secrets are similar (or not similar)

1454 measurement of secret similarity under a metric 1456

1456 secret similarity metric; secrets 204 may be considered similar based on one or more of the following, for example: having the same secret type and strength (e.g., other x509 certs of RSA256; passwords of complexity X), having the same or nearly the same deployment scope (distributed to more than N users or globally across regions, within a stated tolerance), including credentials of same or close lifespan (e.g., not rotated for more than N days within stated tolerance of N), or including certificates issued by the same certification authority or signed by the same certification authority 1458 computationally note an access request 1460 a request for access to an asset, e.g., a login request, a request for authentication or authorization or both, a request for digital signing or validation of a digital signature; may be performed by or via an API, network transmission, or other computing system communication 1462 satisfy a coverage condition 1464 coverage condition describing coverage of secrets or secured assets or both by one or more risk-based secret access or other enhancements disclosed herein 1466 computationally signal a tool or other mechanism, e.g., through a network transmission or API invocation 1468 computationally operate 1470 computationally specify metadata selection criteria 1472 metadata selection criteria, e.g., key words, values or value ranges, metadata type, or any other characteristic of metadata 302

1474 computationally detect an asset characteristic modification 1476 asset characteristic, e.g., location, value, owner, or any other characteristic discussed herein or familiar to one of skill in the art 1478 modification, e.g., creation, deletion, or value change 1480 any step discussed in the present disclosure that has not been assigned some other reference numeral Conclusion In short, the teachings herein provide a variety of risk-based secrets access functionalities which operate in enhanced systems 400. Cybersecurity is enhanced, with particular attention to a consistent and broadly applicable mechanism 400 and process 1400 for controlling access 608 to secrets 204 and their secured assets 402. Technology for risk-based access 608 to secrets 204 utilizes risk metadata 302 tailored to respective secrets 204 which are augmented 1304 by that metadata 302. Secrets 204 include passwords 502, security tokens 532, digital certificates 504, keys 506, 512, 514, 516, 518, 520, 522, 528, and other items used for identity authentication 606, authorization 604, signing 602, validation 614, and other cybersecurity processes. A secret's risk metadata 302 may indicate which controls 206, 306 protect the secret 304, the deployment scope 708 of the secret 304 or the asset 402 it secures, known exposures 716 of the secret 304, whether the secret 304 secures other secrets 204 via a dependence 704, the impact 712 if the secret 304 is misused, the secret's strength 730, characteristics 832 of the asset 402 the secret 304 secures, the secret's risk history 732, and other characteristics (FIGS. 5-12) of secrets 304 that set them apart. Unlike secrets 204, typical user-generated digital assets 202 like web pages, documents, image files, and so on have value on their own. An enhanced system 400 distinguishes 1302 between secrets 204 and non-secrets when modulating 1308, 1310 access 608, making it possible to automatically provide consistent, efficient, and effective risk-based control 306 over access 608 to secrets 204.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware into SIEM software. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 13 and 14 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system configured for risk-based secret access management, the system comprising:

a digital memory, the digital memory configured by a first secret and a second secret, the first secret and the second secret residing in the digital memory, the first secret and the second secret being data that secures other data;

a processor in operable communication with the digital memory, the processor configured to perform risk-based secret access management by computationally identifying a security reliance of the second secret on the first secret, the security reliance indicating that the second secret is secured at least in part by the first secret, and computationally modulating access to the first secret or to the second secret, or both the first secret and the second secret, based on at least one of: a risk score which is associated with the first secret or the second secret and is based at least in part on the security reliance, or risk metadata which is also stored as digital data in the computing system and which augments the first secret or the second secret and is based at least in part on the security reliance.

2. The computing system of claim 1, wherein at least one of the first secret or the second secret residing in the digital memory comprises at least one of the following digital items:

a digital certificate containing a private key of a key pair;
a signed digital certificate containing an identity assertion;
a key of an asymmetric encryption algorithm;
a key of a symmetric encryption algorithm;
a signature key;
an encryption key;
a decryption key;
an authentication key;
a login credential;
a password or passphrase;
a digital representation of biometric data;
an application program key;
a shared access signature;
a bearer token; or
a connection string.

3. The computing system of claim 1, wherein at least one of the first secret or the second secret residing in the digital memory is a computing system asset and comprises at least one of the following:

digital data which is operable as authorization for an attempt to access another computing system asset;
digital data which is operable as authentication for an attempt to access another computing system asset;
digital data which is operable as a decryption key for decrypting another computing system asset;
digital data which is operable as an encryption key for encrypting another computing system asset;
digital data which is operable as a digital signature of another computing system asset;
digital data which is operable as a validation of another computing system asset; or
digital data which is operable for modulation of an attempt to access another computing system asset.

4. The computing system of claim 1, further comprising a plurality of augmented secrets, each augmented secret having respective risk metadata, the risk metadata stored in the digital memory, and wherein the risk metadata of the augmented secrets collectively includes at least five of the following risk metadata items:

a risk score representing risk associated with loss or misuse of the respective augmented secret;

a scope metadata item representing a deployment scope of a respective augmented secret or a deployment scope of an asset secured by the respective augmented secret;

an impact metadata item representing an impact of misuse of an asset that is subject to protection using a respective augmented secret;

an exposure metadata item representing at least one known exposure of a respective augmented secret;

a classification metadata item representing a risk classification of a respective augmented secret obtained from an owner of a service or an asset within the deployment scope of the respective augmented secret;

a protection metadata item representing one or more mechanisms or procedures aimed at preventing unauthorized use of a respective augmented secret;

a strength metadata item representing a likelihood of guessing or brute-forcing a respective augmented secret;

an audit metadata item representing auditing of access to a respective augmented secret;

a risk history metadata item representing a trend or a projection of risk to an asset secured by a respective augmented secret;

a transitivity metadata representing a dependence between a respective augmented secret and another secret; or an identifier metadata item which identifies a respective augmented secret without revealing the respective augmented secret.

5. The computing system of claim 1, further comprising a plurality of augmented secrets, each augmented secret having respective risk metadata, the risk metadata stored in the digital memory, and wherein the risk metadata of the augmented secrets collectively includes at least five of the following risk metadata items:

a scope metadata item indicating how many virtual machines a respective augmented secret has been deployed on;

a scope metadata item indicating how many cloud regions a respective augmented secret has been deployed in;

a scope metadata item indicating how many hosts a respective augmented secret has been deployed in;

a scope metadata item indicating whether a respective augmented secret has been deployed in all regions of a cloud;

a scope metadata item indicating whether any replicated service utilizes a respective augmented secret;

a scope metadata item indicating a characteristic of an asset secured by a respective augmented secret;

a scope metadata item indicating a deployment scope of an asset secured by a respective augmented secret;

a scope metadata item indicating a sharing extent of a respective augmented secret;

an exposure metadata item indicating whether a respective augmented secret has been exposed in the clear to a human;

an exposure metadata item indicating whether a respective augmented secret has been transmitted in the clear on a network;

an exposure metadata item indicating whether a respective augmented secret has been stored in the clear on nonvolatile storage;

an exposure metadata item indicating whether a respective augmented secret has been stored in the clear on volatile storage;

an exposure metadata item indicating whether a respective augmented secret has been copied to a location outside the deployment scope;

an exposure metadata item indicating whether a respective augmented secret has been copied to a removable storage device;

an exposure metadata item indicating whether source code utilizing or invoking a respective augmented secret has been detected;

an exposure metadata item indicating whether a respective augmented secret resides in a honeypot;

a protection metadata item indicating whether access to a respective augmented secret is subject to an access control list;

a protection metadata item indicating whether access to a respective augmented secret is subject to a secrets manager service;

a protection metadata item indicating whether access to a respective augmented secret is subject to a hardware-backed key;

a protection metadata item indicating whether source code utilizing or invoking a respective augmented secret is subject to code review;

a protection metadata item indicating whether a respective augmented secret is stored in a hardware security module;

a protection metadata item indicating whether a respective augmented secret is stored in an air-gapped location;

a protection metadata item containing or otherwise identifying an attestation that a respective augmented secret is subject to a specified protection;

a protection metadata item indicating a characteristic of an entity which attested to, authenticated, confirmed, validated, or otherwise affirmed a respective augmented secret;

a protection metadata item indicating a characteristic of an entity which created, generated, or otherwise originated a respective augmented secret;

a protection metadata item indicating a characteristic of an entity which stored, transmitted, or otherwise possessed a copy of a respective augmented secret;

a protection metadata item indicating a characteristic of a physical device or a physical facility which stored, transmitted, or otherwise possessed a copy of a respective augmented secret;

a rotation metadata item representing a last rotation date or a creation date for a respective augmented secret;

a rotation metadata item representing an expiration date for a respective augmented secret;

an audit metadata item indicating whether access to a respective augmented secret is subject to auditing; or an audit metadata item indicating whether access to a respective augmented secret is subject to auditing recorded on an immutable storage device.

6. The method of claim 1, further comprising a plurality of augmented secrets, each augmented secret having respective risk metadata, the risk metadata stored in the digital memory, and wherein the risk metadata collectively comprises at least eight risk metadata items from the following: zero or more scope metadata items, zero or more impact metadata items, zero or more exposure metadata items, zero or more rotation metadata items, zero or more classification metadata items, zero or more protection metadata items, zero or more audit metadata items, zero or more transitivity metadata items, zero or more risk history metadata items, zero or more strength metadata items, and zero or more identifier metadata items.

7. A method for risk-based secret access management utilizing a first secret and a second secret, each of which is stored as digital data in a computing environment, each secret being data that secures other data, the method comprising:

computationally identifying a security reliance of the second secret on the first secret, the security reliance indicating that the second secret is secured at least in part by the first secret; and computationally modulating access to the first secret or to the second secret, or both, based on at least one of: a risk score which is associated with the first secret or the second secret and is based at least in part on the security reliance, or risk metadata which is also stored as digital data in the computing environment and which augments the first secret or the second secret and is based at least in part on the security reliance.

8. The method of claim 7, wherein the method distinguishes functionally in at least one of the following ways between access to computing system assets which are secrets and access to computing system assets which are not secrets:

the first secret or the second secret is augmented with risk metadata which does not augment any computing system asset that is not a secret;

the risk score is calculated by a scoring procedure which is not employed for scoring risk for any computing system asset that is not a secret; or the secret access modulating employs a modulating procedure which is not employed for modulating access to any computing system asset that is not a secret.

9. The method of claim 7, further comprising calculating the risk score, wherein said calculating comprises at least one of the following:

receiving the risk score from a machine learning model which was trained using risk metadata which does not augment any computing system asset that is not a secret; or employing a scoring procedure which depends on at least two of the following: a scope metadata item indicating a deployment scope of the first secret or the second secret, an impact metadata item representing an impact of misuse of data that is subject to protection using the first secret or the second secret, an exposure metadata item indicating at least one known exposure of the first secret or the second secret, a classification metadata item representing a risk classification of the first secret or the second secret, a protection metadata item representing mechanisms or procedures aimed at preventing unauthorized use of the first secret or the second secret, a strength metadata item representing a likelihood of guessing or brute-forcing the first secret or the second secret, an audit metadata item representing auditing of access to the first secret or the second secret, a risk history metadata item representing historic risk to an asset secured by the first secret or the second secret, or a transitivity metadata item representing a dependence between the first secret or the second secret and another secret.

10. The method of claim 7, wherein modulating access to the first secret or the second secret based on at least the risk score comprises at least one of the following:

increasing an authentication requirement for access to an asset that is within the deployment scope of the first secret or the second secret when the risk score meets or exceeds a predetermined threshold;

increasing an authorization requirement for access to an asset that is within the deployment scope of the first secret or the second secret when the risk score meets or exceeds a predetermined threshold;

forcing or recommending rotation of the first secret or the second secret, based at least in part on the risk score;

producing a report which depends on the risk score;

auditing access to the first secret or the second secret based at least in part on the risk score; or alerting based at least in part on the risk score.

11. The method of claim 7, wherein the first secret or the second secret secures an asset, and the method further comprises:

detecting a modification of a characteristic of the asset;

recalculating the risk score for the first secret or the second secret, the recalculated risk score dependent on the asset characteristic modification; and modulating access to the first secret or the second secret based on at least the recalculated risk score.

12. The method of claim 7, wherein the first secret or the second secret is augmented by one or more of impact metadata, scope metadata, or classification metadata, and wherein the method further comprises:

detecting an attempt to make an instance of the first secret or the second secret reside at a new location;

determining that the new location is less secure than a current location of the first secret or the second secret; and responding to the determination by performing at least one of the following: blocking the first secret or the second secret from residing at the new location, alerting, requiring additional authentication or additional authorization or both before allowing the first secret or the second secret to reside at the new location, or increasing security requirements or security capabilities or both at the new location.

13. The method of claim 7, further comprising calculating the risk score, wherein said calculating comprises:

identifying an asset that is secured by the first secret or the second secret;

getting an impact value representing a breach of security due to compromise of the first secret or the second secret; and calculating the risk score for the first secret or the second secret based at least in part on the impact value.

14. The method of claim 7, further comprising calculating the risk score based at least in part on the security reliance.

15. The method of claim 7, further comprising at least one of the following:

computationally ascertaining whether two secrets are similar according to a specified similarity metric;

reporting which secrets have a specified risk score;

reporting which assets are secured by a secret which has a specified risk score;

reporting which access attempts include a secret having a specified risk score;

reporting which users are authorized to utilize a secret having a specified risk score; or reporting changes in a secret's risk score.

16. A computer-readable storage medium configured with data and instructions which upon execution by a processor cause a computing system to perform a method for risk-based secret access management utilizing a first secret and a second secret, each of which is stored as digital data in a computing environment, each secret being data that secures other data, the method comprising:

computationally identifying a security reliance of the second secret on the first secret, the security reliance indicating that the second secret is secured at least in part by the first secret; and computationally modulating access to the first secret or to the second secret, or both, based on at least one of: a risk score which is associated with the first secret or the second secret and is based at least in part on the security reliance, or risk metadata which is also stored as digital data in the computing environment and which augments the first secret or the second secret and is based at least in part on the security reliance.

17. The medium of claim 16, further characterized by satisfying at least one of the following coverage conditions:
at least 90% of secrets which secure accounts in the computing environment having elevated privilege are augmented secrets having respective risk metadata;
at least 90% of secrets which secure accounts in the computing environment having virtual machine deployment capability are augmented secrets having respective risk metadata;
at least 90% of secrets which secure one or more assets in the computing environment having access to management credentials are augmented secrets having respective risk metadata;
at least 90% of secrets which secure multiple accounts in the computing environment are augmented secrets having respective risk metadata;
at least 90% of secrets which secure one or more assets accessible to multiple accounts in the computing environment are augmented secrets having respective risk metadata;
all secrets which reside in a specified honeypot are augmented secrets having respective risk metadata;
all secrets which have a specified deployment scope are augmented secrets having respective risk metadata; or
at least 50% of passwords or pass phrases in the computing environment are augmented secrets having respective risk metadata.

18. The medium of claim 16, further comprising at least one of the following:
reporting who has direct access to any augmented secret whose respective risk metadata meets specified criteria;
reporting who has indirect access to any augmented secret whose respective risk metadata meets specified criteria; or
reporting any augmented secret whose respective risk metadata meets specified criteria.

19. The medium of claim 16, further comprising at least one of the following:
signaling a dynamic authorization mechanism in response to risk metadata of an augmented secret;
signaling a SIEM in response to risk metadata of an augmented secret;
signaling a secret revocation system or a secret rotation system in response to risk metadata of an augmented secret;
signaling a threat detection system in response to risk metadata of an augmented secret; or
signaling an intrusion detection system in response to risk metadata of an augmented secret.

20. The medium of claim 16, wherein the computing environment is a cloud computing environment.

* * * * *